(12) United States Patent
Wisnia et al.

(10) Patent No.: US 12,534,045 B2
(45) Date of Patent: *Jan. 27, 2026

(54) VEHICLE CONTROL SYSTEM

(71) Applicant: Light Wave Technology Inc., St-Laurent (CA)

(72) Inventors: Jack Wisnia, Dollard-des Ormeaux (CA); James Speers, St. Albert (CA); Robert Nelson, Westmount (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/186,453

(22) Filed: Mar. 20, 2023

(65) Prior Publication Data

US 2023/0219526 A1   Jul. 13, 2023

Related U.S. Application Data

(63) Continuation-in-part of application No. 17/968,033, filed on Oct. 18, 2022, now abandoned, which is a
(Continued)

(51) Int. Cl.
 *B60R 25/24* (2013.01)
 *B60R 25/20* (2013.01)
 (Continued)

(52) U.S. Cl.
 CPC .......... *B60R 25/246* (2013.01); *B60R 25/209* (2013.01); *B60R 25/245* (2013.01);
 (Continued)

(58) Field of Classification Search
 CPC ............ B60R 2325/205; B60R 25/002; B60R 25/2072; B60R 25/209; B60R 25/246;
 (Continued)

(56) References Cited

U.S. PATENT DOCUMENTS 3,697,905 A   10/1972   Athans, Jr.
5,397,869 A   3/1995   Huen
(Continued)

FOREIGN PATENT DOCUMENTS

CA   2601442 A1   3/2008
CA   2852866 A1   11/2014
(Continued)

OTHER PUBLICATIONS

Garcia, Flavio D., et al. "Lock It and Still Lose It-on the (In) Security of Automotive Remote Keyless Entry Systems." USENIX Security Symposium. 2016.
(Continued)

*Primary Examiner* — Yong Hang Jiang
(74) *Attorney, Agent, or Firm* — Anglehart et al.

(57) ABSTRACT

The present disclosure provides an apparatus, method and system for use with a vehicle having passive keyless entry and start (PKES) system including a vehicle unit and a key fob storage unit. The vehicle unit is to be installed with the vehicle having a first transceiver, a first relay transceiver an authentication unit, a first controller for controlling said first relay transceiver allowing said transmission if said user is authenticated. The key fob storage unit comprises at least one housing for securely holding at least one key fob associated with said PKES systems of said vehicles, a second, said second wireless relay w wherein said first relay transceiver and said second relay transceiver allows said PKES system and said key fob to communicate from a distance larger than a range of said PKES system signals.

20 Claims, 24 Drawing Sheets

Related U.S. Application Data continuation-in-part of application No. 17/677,604, filed on Feb. 22, 2022, now abandoned, which is a continuation-in-part of application No. 17/130,849, filed on Dec. 22, 2020, now Pat. No. 11,285,917.

(60) Provisional application No. 62/954,460, filed on Dec. 28, 2019.

(51) Int. Cl.
  *B60R 25/31* (2013.01)
  *B60R 25/40* (2013.01)

(52) U.S. Cl.
  CPC ............ *B60R 25/31* (2013.01); *B60R 25/406* (2013.01); *B60R 2325/105* (2013.01)

(58) Field of Classification Search
  CPC ..... B60R 25/245; B60R 25/31; B60R 25/406; G05G 7/10; G07C 2009/00984; G07C 9/00174; G07C 9/00896; G07C 9/00944; G08C 17/02; G08C 2201/30; H01H 9/0235

See application file for complete search history.

(56) References Cited

U.S. PATENT DOCUMENTS

| | | | |
|---|---|---|---|
| 5,955,796 | A | 9/1999 | Nilssen |
| 6,236,333 | B1* | 5/2001 | King ................ B60R 25/2036 340/5.1 |
| 6,714,106 | B1 | 3/2004 | Czarnecki et al. |
| 6,956,460 | B2 | 10/2005 | Tsui |
| 7,189,936 | B2 | 3/2007 | Gray, Jr. |
| 7,372,355 | B2 | 5/2008 | Agronin et al. |
| 7,463,134 | B1 | 12/2008 | Stilley |
| 7,821,383 | B2 | 10/2010 | Sultan et al. |
| 8,286,521 | B2 | 10/2012 | McIlroy et al. |
| 8,854,181 | B2 | 10/2014 | Lopez et al. |
| 8,976,002 | B2 | 3/2015 | Tsui et al. |
| 9,002,536 | B2 | 4/2015 | Hatton |
| 9,126,692 | B2 | 9/2015 | Melkers |
| 9,210,979 | B2 | 12/2015 | Packer |
| 9,384,612 | B2 | 7/2016 | Lopez |
| 9,454,860 | B2 | 9/2016 | Lopez |
| 9,508,204 | B2 | 11/2016 | Oz et al. |
| 9,520,247 | B1 | 12/2016 | Finnegan et al. |
| 9,536,365 | B2 | 1/2017 | Wisnia |
| 9,576,414 | B2 | 2/2017 | Tieman |
| 9,894,492 | B1 | 2/2018 | Elangovan et al. |
| 10,034,146 | B2* | 7/2018 | Chuang ................ H04W 4/023 |
| 10,196,039 | B2 | 2/2019 | Wisnia |
| 10,400,735 | B2 | 9/2019 | Wisnia et al. |
| 10,960,849 | B2 | 3/2021 | Tieman |
| 10,977,930 | B2 | 4/2021 | Tieman |
| 10,991,237 | B1 | 4/2021 | Sute et al. |
| 11,285,917 | B1 | 3/2022 | Wisnia et al. |
| 2002/0084694 | A1 | 7/2002 | Quesnel et al. |
| 2005/0194243 | A1 | 9/2005 | Prineppi |
| 2007/0176788 | A1 | 8/2007 | Mor et al. |
| 2007/0200663 | A1 | 8/2007 | White et al. |
| 2007/0262847 | A1 | 11/2007 | Grabinger et al. |
| 2009/0288937 | A1 | 11/2009 | Agronin et al. |
| 2011/0215899 | A1* | 9/2011 | Van Wiemeersch .... B60R 25/04 340/5.24 |
| 2012/0139841 | A1 | 6/2012 | Taylor et al. |
| 2012/0292174 | A1 | 11/2012 | Mah et al. |
| 2013/0088326 | A1 | 4/2013 | Bassali |
| 2013/0259232 | A1 | 10/2013 | Petel |
| 2013/0293348 | A1* | 11/2013 | Obergfell ................ B60R 25/24 340/5.61 |
| 2013/0297194 | A1 | 11/2013 | Wisnia et al. |
| 2014/0176301 | A1 | 6/2014 | Fernandez Banares et al. |
| 2014/0188348 | A1* | 7/2014 | Gautama ............... B60W 10/30 701/48 |
| 2014/0240086 | A1 | 8/2014 | Van Wiemeersch |
| 2014/0266583 | A1 | 9/2014 | Lopez |
| 2014/0342668 | A1* | 11/2014 | Kyomitsu .......... G07C 9/00944 455/575.1 |
| 2015/0029010 | A1* | 1/2015 | Wisnia .................. B60R 25/209 340/426.17 |
| 2015/0045013 | A1 | 2/2015 | Simmons |
| 2015/0161832 | A1 | 6/2015 | Esselink et al. |
| 2015/0321643 | A1* | 11/2015 | Nowottnick ......... H04B 17/318 340/5.6 |
| 2016/0203661 | A1* | 7/2016 | Pudar ................. G07C 9/00571 340/5.25 |
| 2016/0217635 | A1 | 7/2016 | Pudar et al. |
| 2016/0225203 | A1* | 8/2016 | Asmar ............... G07C 9/00309 |
| 2017/0057353 | A1* | 3/2017 | Griffin ................. A61B 5/4845 |
| 2017/0285634 | A1* | 10/2017 | Chin ...................... G08C 17/02 |
| 2018/0029560 | A1* | 2/2018 | Mohaupt ............. B60R 25/255 |
| 2018/0084371 | A1* | 3/2018 | Scagnol ................. H04W 4/80 |
| 2018/0115859 | A1 | 4/2018 | Ghabra et al. |
| 2018/0316788 | A1* | 11/2018 | Elliott ..................... H04W 4/02 |
| 2019/0168712 | A1* | 6/2019 | Yakovenko ............ B60R 25/24 |
| 2019/0266821 | A1* | 8/2019 | Balakrishna .......... B60R 25/245 |
| 2020/0112859 | A1 | 4/2020 | Reedman |
| 2020/0257330 | A1* | 8/2020 | Tieman .................. G08C 17/02 |
| 2020/0398787 | A1* | 12/2020 | Kong ................... B60R 25/245 |

FOREIGN PATENT DOCUMENTS

| | | | | |
|---|---|---|---|---|
| CN | 106887353 | A | | 6/2017 |
| CN | 104867724 | B | | 8/2020 |
| JP | 2013533400 | A | * | 8/2013 ......... G07C 9/00944 |
| JP | 2019512630 | A | | 5/2019 |
| JP | 2021167151 | A | | 10/2021 |
| JP | 2021188309 | A | | 12/2021 |
| KR | 20070026743 | A | | 3/2007 |

OTHER PUBLICATIONS

International application No. PCT/CA2022/050357 International Search Report dated Dec. 18, 2022.

International application No. PCT/CA2022/050357 Written Opinion of the International Searching Authority dated Dec. 8, 2022.

International application No. PCT/CA2022/050357 Supplementary International Search Report dated Jun. 10, 2024.

* cited by examiner

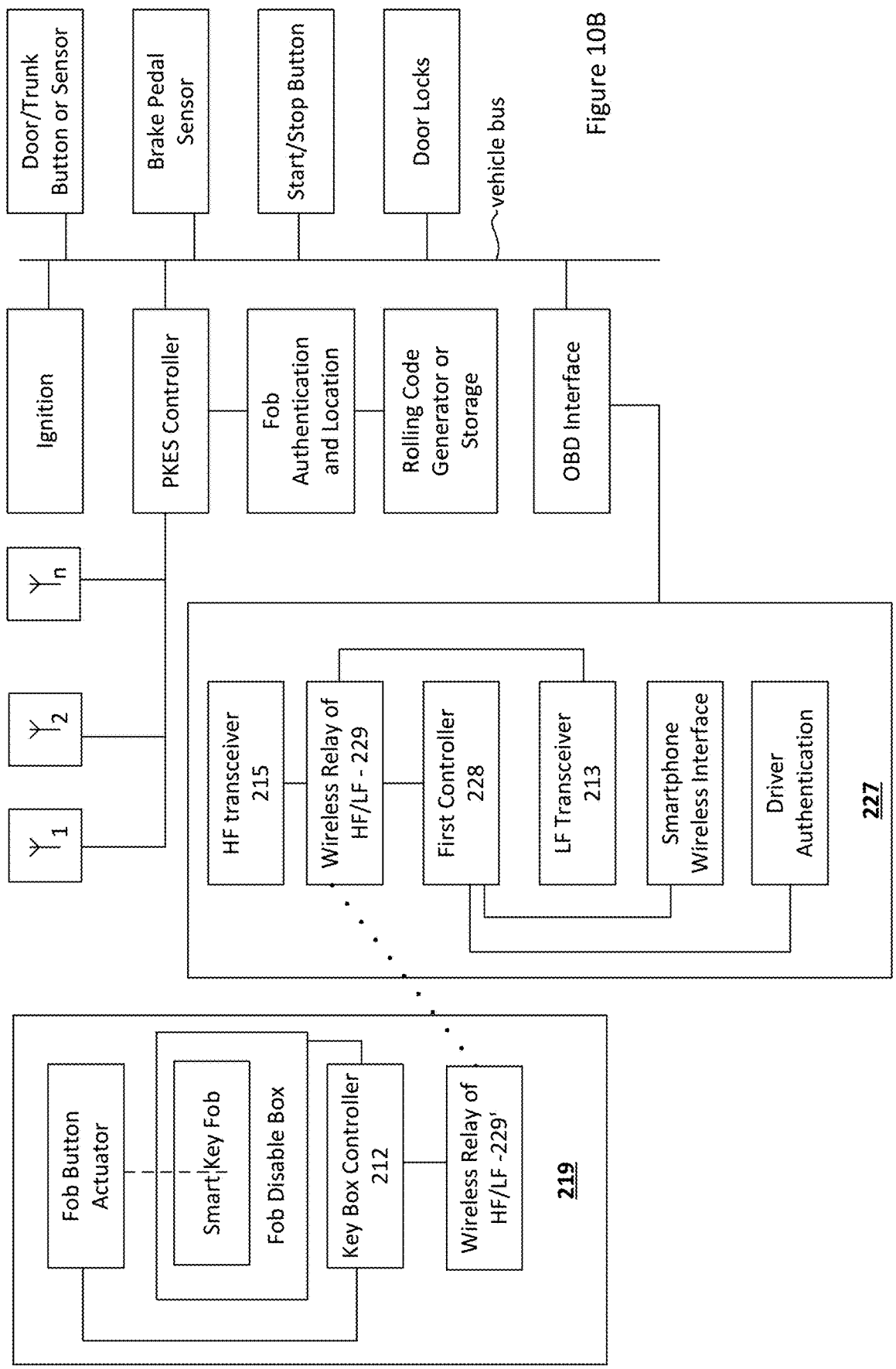

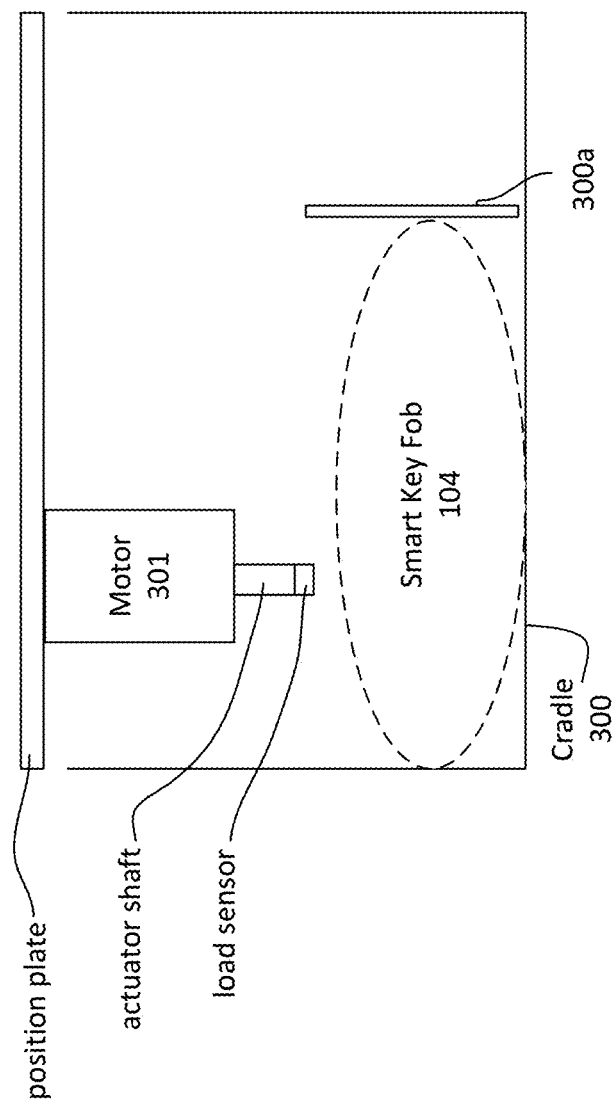

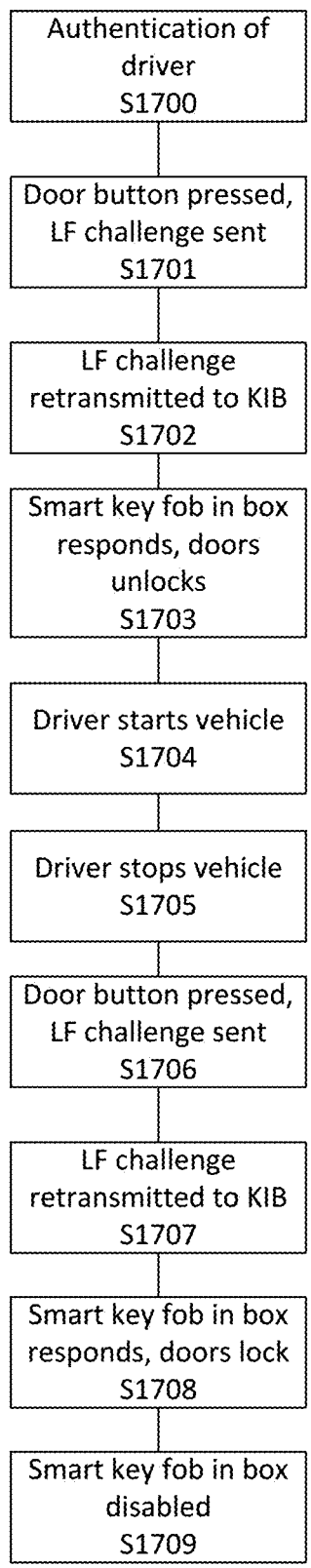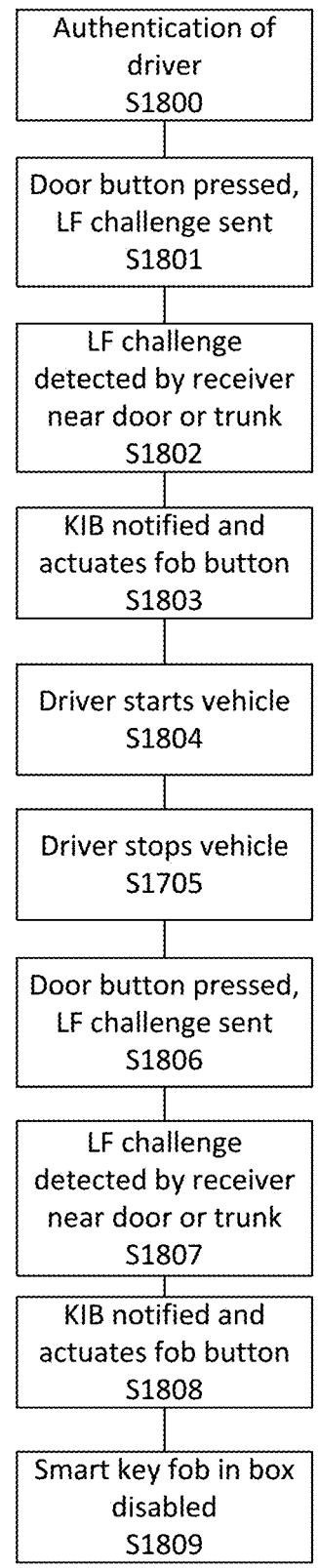
Figure 17
Figure 18

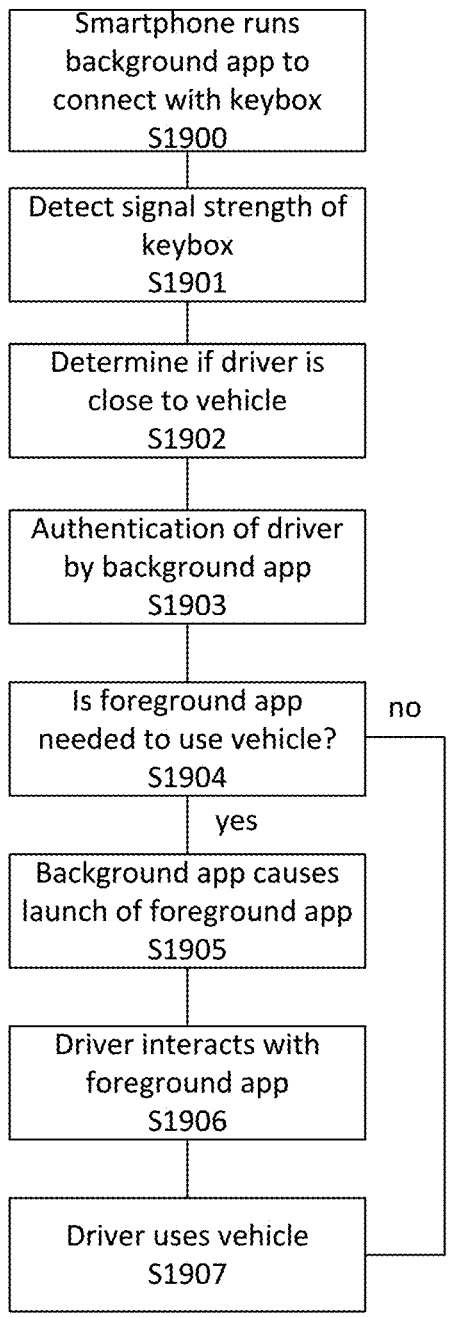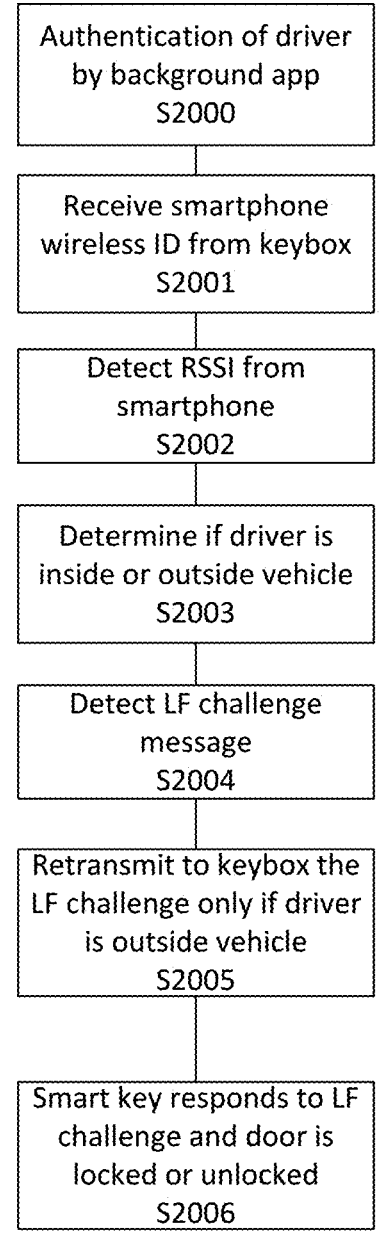
Figure 19
Figure 20

VEHICLE CONTROL SYSTEM

CROSS-REFERENCE TO RELATED APPLICATIONS

The present application is a continuation-in-part of U.S. patent application Ser. No. 17/968,033 filed Oct. 18, 2022 that is a continuation-in-part of U.S. patent application Ser. No. 17/677,604 filed Feb. 22, 2022 that is a continuation-in-part of U.S. patent application Ser. No. 17/130,849 filed Dec. 22, 2020, now U.S. Pat. No. 11,285,917, that in turn claims priority of U.S. provisional patent application Ser. No. 62/954,460 filed 28 Dec. 2019, the contents of which are hereby incorporated by reference.

TECHNICAL FIELD

The present application relates to systems, devices and methods for controlling vehicles equipped with passive keyless entry and start (PKES) systems.

BACKGROUND

Most vehicles today operate using a smart key. Such vehicles communicate wirelessly with the driver's smart key to authenticate the driver so as to allow the driver to operate the vehicle without inserting the key and instead by pushing a start button in the car. Some such vehicles use the wireless communication to determine if the smart key fob is inside or outside of the vehicle, and also to allow for unlocking and locking of the vehicle doors by using buttons or sensors at the exterior of the car door instead of requiring the driver to use the key mechanically.

Smart keys can provide the convenience that no manipulation of the key may be necessary to operate the vehicle so long as the key is carried by the driver. Most vehicles are sold with two smart keys for use by two drivers.

While additional keys can be ordered from the car manufacturer, these come at substantial additional cost and requires planning for provisioning keys for each driver.

SUMMARY

The present disclosure provides, among others, solutions addressing the above-mentioned problems with the existing systems. This patent application provides complementary improvements that may be applied separately or in combination.

When smart keys are issued to a number of drivers, the chances that one smart key would fall into the hands of a thief or an unauthorized driver increases. The applicant has found that improved security and convenience can be achieved when additional smart keys are not provided for additional drivers of a PKES vehicle, and instead a smart key is intelligently shared by the drivers of a vehicle. The applicant proposes in this patent application solutions that can allow better authentication of drivers and also allow better sharing of a vehicle among a number of drivers.

In one broad aspect, the present disclosure provides a device for use with a vehicle having a passive keyless entry and start (PKES) system. The device comprises a wireless interface for local communication with a driver's device, a housing for securely holding a key fob associated with the PKES system, a trigger signal receiver. In this specification, "key fob" means an OEB key fob provided to a vehicle owner from the vehicle manufacturer or dealer as well as any functional equivalent to an OEM key fob, such as a key fob cloning circuit. While in the case of an OEB key fob, securely holding the key fob involves an enclosure structure, in the case of a key fob cloning circuit, it can be securely held in the housing of the device by including the integrated circuit on a circuit board of the device within the housing. The device uses one or more of a jamming transmitter, a key fob power supply connectable to battery contacts of the key fob and a switchable RF shield for disabling wireless communications of the key fob inside the housing. For locking/unlocking doors of the vehicle, the device also has either at least one mechanical or electronic actuator for causing at least a door lock/unlock function of the key fob in the housing to be activated, a door lock/unlock interface connected to a vehicle data bus or an interior door lock/unlock switch, a challenge transmission wireless receiver and repeater for receiving and repeating a challenge transmission from the PKES system or a lock/unlock code receiver, storage and transmitter unit. The device also comprises a processor operatively connected to the wireless interface, to the trigger signal receiver and to a non-transitory memory storing executable instructions. The executable instructions causing determination whether the driver's device is located inside or outside the vehicle with a signal of the driver's device as measured by the wireless interface. The executable instructions also causing the processor to communicate with the driver's device to determine if a driver associated with the driver's device is authorized to use the vehicle, to control the disabling wireless communications of the key fob accordingly so as to prevent/permit the driver to operate the vehicle when the driver is unauthorized/authorized to use the vehicle by controlling at least one of the jamming transmitter, the key fob power supply and the switchable RF shield when the determination confirms that the driver's device is inside the vehicle. The executable instructions further causing the processor to respond to receipt of the trigger signal when the determination confirms that the driver's device is outside the vehicle as a door lock/unlock command by one of signaling the mechanical or the electrical actuator to activate the door lock/unlock function while causing the disabling wireless communications of the key fob so the PKES does not detect the key fob as being inside the vehicle, or controlling the disabling wireless communications of the key fob with respect to the challenge transmission received by the challenge transmission wireless transmitter to permit the PKES system to proceed with a door lock/unlock operation, or issuing a door lock/unlock command to the door lock/unlock interface, or causing the lock/unlock code receiver, storage and transmitter unit to transmit a stored lock/unlock code.

In some embodiments, the driver's device is a computing device and the executable instructions cause the processor to perform cryptographic communication with the computing device.

In some embodiments, the memory stores a number of predetermined single-usage tokens associated with a driver that determine authorization.

In some embodiments, the instructions cause the memory to store the tokens only in a configuration mode.

In some embodiments, the instructions cause the memory to store driver usage condition data in a configuration mode, and the executable instructions cause a driver associated with the driver's device to be authorized to use the vehicle only when conditions for the driver as defined by the driver usage condition data are met.

In some embodiments, at least one electronic actuator for causing a door lock switch and a door unlock switch of the key fob in the housing to be closed, where the processor is operatively connected to the wireless interface, to the trigger signal receiver and to the non-transitory memory storing executable instructions causing to respond to receipt of the trigger signal when the determination confirms that the driver's device is outside the vehicle as a door lock/unlock command by signaling the electronic actuator to close the door lock/unlock switch while causing the disabling wireless communications of the key fob so that the PKES does not detect the key fob as being inside the vehicle.

In some embodiments, at least one electronic actuator comprises at least one probe card connectable to the processor having probe pins corresponding to traces or contacts of fob buttons on a circuit board of the key fob.

In some embodiments, the instructions cause the processor to detect the door lock and/or the door unlock command by interpreting signals from the driver's device received over the wireless interface.

In some embodiments, the executable instructions cause the processor to determine from a signal strength of the driver's device as measured by the wireless interface whether the driver's device is located inside or outside the vehicle.

In some embodiments, the executable instructions prevent unlocking and/or locking of the doors when the driver's device is determined to be inside the vehicle.

In some embodiments, a wireless relay separate from the wireless interface, the wireless relay for location in the vehicle near a driver location and configured to measure the signal strength and to relay the signal strength to the wireless interface.

In some embodiments, an RFID reader module for mounting near a window of the vehicle and having a battery and a transmitter for transmitting to the wireless interface RFID data, the executable instructions causing the processor to determine if the driver is authorized to use the vehicle based on the RFID data. If the driver is not authorized, the instructions may cause a system administrator to be notified of a non-authorized attempt and erase the lock/unlock code to prevent further non-authorized attempts to use the device.

In one broad aspect, the present disclosure provides a method for operating a passive keyless entry and start (PKES) system when an associated key fob is not within a range of the PKES system. The method comprises securing a key fob associated with the PKES system in a housing comprising a wireless interface for local communication with a driver's device within a range of the PKES system, limiting communication of the key fob with the PKES system, authenticating a user by wireless communication with a driver's device, determining from a signal of the driver's device as measured by the wireless interface whether the driver's device is located inside or outside the vehicle, detecting a trigger signal, controlling door lock and unlock functions of the vehicle to allow the authenticated user to access the vehicle and to lock the vehicle when the use of the vehicle is terminated in accordance with the determining in response the trigger signal and to the determining when the driver's device is outside the vehicle, and selectively allowing communication of the key fob with the PKES system to allow the authenticated user operate the vehicle.

In some embodiments, the determining comprises determining from a signal strength of the driver's device whether the driver's device is located inside or outside the vehicle.

Some embodiments are further comprising receiving from the driver's device control commands of the authenticated driver and relaying the control commands to the wireless interface to create corresponding commands for the vehicle.

In some embodiments, the limiting communication of the key fob with the PKES system comprises disconnecting power supply to the key fob.

In some embodiments, the limiting communication of the key fob with the PKES system comprises disconnecting power supply to the key fob.

In some embodiments, the limiting communication of the key fob with the PKES system comprises forming a Faraday cage around the key fob.

In one broad aspect, the present disclosure provides a method for operating a passive keyless entry and start (PKES) system when an associated key fob is not in a range of said PKES system. The method comprises detecting challenge signals sent by the PKES system when at least one sensor of said vehicle is activated by a user having a mobile computing device, authenticating said mobile computing device to allow relaying of said challenge signals to said key fob not in said range of the PKES system, detecting response signals sent by said key fob in response to said challenge signals, and relaying said response signals to said PKES system to respond to said activated sensor accordingly.

In one broad aspect, the present disclosure provides a key fob actuator device comprises a cradle having a holding mechanism for holding said key fob in a chosen location, an actuator mechanism positioned relative to said cradle to allow actuation of buttons of said key fob, a controller receiving control commands and moving said actuator mechanism to actuate said buttons accordingly.

In some embodiments, the holding mechanism may comprise a crushable foam holding said key fob in a desired position.

In some embodiments, the holding mechanism may comprise a custom foam holding said key fob in a desired position.

In some embodiments, the holding mechanism may comprise a custom foam holding said key fob in a desired position.

In some embodiments, the holding mechanism may comprise clamps holding said key fob in a desired position.

In one broad aspect, the present disclosure provides an actuator mechanism comprising a first moving mechanism providing said actuating mechanism with movement in the first axis, a second moving mechanism providing said actuating mechanism with movement in a second axis, a button actuator for pushing said buttons, wherein said button actuator is movable by said first and second moving mechanism along said first and second axis to the locations of said buttons.

In some embodiments, the locations of the buttons may be recognized using a photo of said key fob and are communicated with the key fob actuator device.

In some embodiments, the locations of the buttons may be recognized using information regarding make and model of a vehicle having said key fob.

In one broad aspect, the present disclosure provides an apparatus for use with a vehicle having passive keyless entry and start (PKES) system. The system comprises a vehicle unit for installation with said vehicles, and a key fob storage unit. The vehicle unit comprises a first transceiver for receiving from and transmitting to said PKES system and transmitting signals, a first relay transceiver receiving said signals from said first transceiver and relaying said signals to a second relay transceiver, an authentication unit for authenticating a user of said vehicle using a mobile computing device, a first controller for controlling said first relay transceiver allowing said transmission if said user is authenticated. The key fob storage unit comprises at least one housing for securely holding at least one key fob associated with said PKES systems of said vehicles, a second transceiver for receiving from and transmitting to said at least one key fob signals, said second wireless relay for transmitting said signals with said first relay transmitter, wherein said first relay transceiver and said second relay transceiver allows said PKES system and said key fob to communicate from a distance larger than a range of said PKES system signals.

In some embodiments, the key fob storage unit may further comprise an actuator mechanism for keys of said key fob.

In some embodiments, the key fob storage unit may further comprise an interface to control said second wireless relay.

In some embodiments, the key fob storage unit may further comprise an interface to allow said second wireless relay relaying said response signals.

In some embodiments, the key fob storage unit may further comprise a second controller allowing said key fob storage unit to communicate with a plurality of said vehicle units.

In some embodiments, the key fob storage unit may further comprise an interface to allow said second wireless relay relaying said response signals.

BRIEF DESCRIPTION OF THE DRAWINGS

The invention will be better understood by way of the following detailed description of embodiments of the invention with reference to the appended drawings, in which:

FIG. 10B is a schematic block diagram of a key-in-box (KIB) system working with a mobile app wherein a key fob associated with a PKES system is outside a range of the PKES system located and communicates with the vehicle with a wireless relay in accordance with one embodiment of the present disclosure;

FIG. 14D illustrates an embodiment of the electromechanical fob key actuator mechanism in which the actuator includes a load sensor;

FIG. 17 is a flow diagram of a third embodiment of the steps involved in using a vehicle with a KIB device using a low-frequency receiver and re-transmitter to allow for the PKES to work with outside door buttons to unlock and lock the vehicle;

FIG. 18 is a flow diagram of a fourth embodiment of the steps involved in using a vehicle with a KIB device using a low-frequency receiver and re-transmitter to allow for the PKES to work by detecting a low-frequency challenge near the doors of the vehicle by a receiver to unlock and lock the vehicle;

FIG. 19 is a flow diagram of a fifth embodiment of the steps involved in using a vehicle with a KIB device using proximity detection of a driver's smartphone to cause automatic unlocking of the vehicle when the driver's smartphone is within close range;

FIG. 20 is a flow diagram of sixth embodiment of the steps involved in using a vehicle with a KIB device using proximity detection of a driver's smartphone ID to actuate the fob buttons of the vehicle when the driver's smartphone is within close range;

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

As known in the art, smart keys can provide the convenience that no manipulation of the key may be necessary to operate the vehicle so long as the key is carried by the driver but they have their own limitation as having additional keys can be both expensive and complicated as they have to be ordered from the dealership and delivered from the car manufacturer which requires a longer period.

This may be more concerning when multiple drivers want to use the same vehicle and need their own independent keys. For example, if a vehicle is to be used for car-sharing proposes, the vehicle PKES system may have to be altered or changed so that multiple users can use the vehicle without requiring additional fobs for each user. Some examples of such systems may use an electronic card to authorize the use of the vehicle. This application provides a solution to this problem by providing access to the vehicle using one key fob to authorize multiple drivers using a computing device such as a smartphone.

Furthermore, when multiple users each have a smart key fob, it provides each user with unlimited access to the vehicle that may not be desirable in some cases. The present disclosure further provides a method, system and device which can provide conditional, limited or full access to one or more users either through a computing device or through an application working on the computing device.

In this application OEM refers to Original Equipment Manufacturer. The OEM is the original producer of a vehicle's components. The System 100 is an example of OEM Passive keyless entry used in a vehicle.

Figure 1:
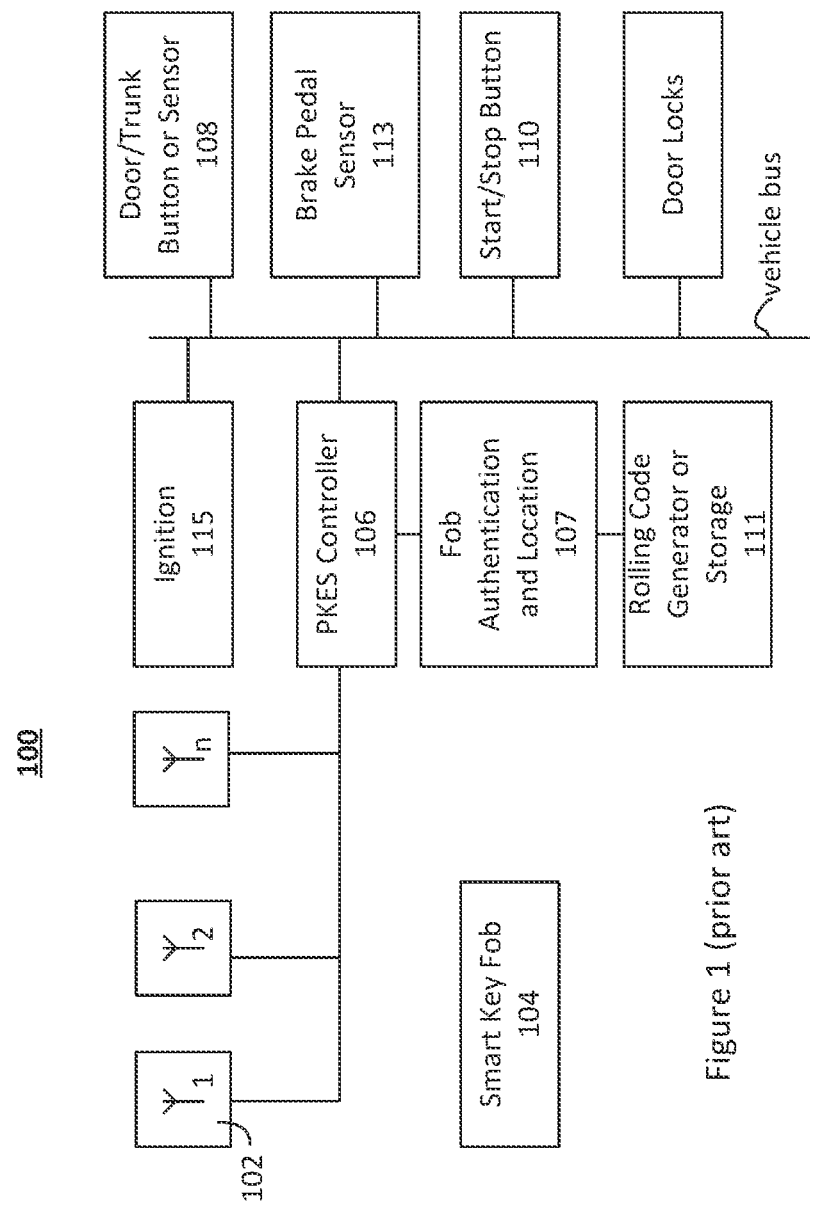
FIG. 1 is a schematic block diagram of a prior art passive keyless entry and start (PKES) system.

FIG. 1 schematically illustrates a conventional passive keyless entry and start (PKES) system 100 also referred to as OEM security system 100. Antenna 102 may be located on the outside of the door panels as well as inside the vehicle. In some systems, the PKES controller 106 in the vehicle sends a wireless challenge message to the smart key 104 over the antennas and waits for the smart key to respond in a way that allows the PKES system 100 to identify the location of the smart key, namely inside or outside of the vehicle. Some systems use a directional antenna in the smart key fob to detect a position of the key with respect to the antennas, with the direction information received at the smart key 104 being sent back to the PKES in its response.

The PKES system 100 also authenticates the smart key fob using a security protocol. When the door (and optionally trunk) lock and unlock button 108 are pressed on the smart key or fob 104, a system of rolling codes (stored in memory 111) may be used as a way to ensure that a simple one-way message can be trusted to control access to the vehicle.

The PKES controller 106 is typically a proprietary system specific to the vehicle manufacturer and is known to vary over time and with the vehicle model. Smart key location and authentication module 107 can comprise software in the vehicle's computer controller. When the button 110 and the brake pedal sensor 113 are activated, the controller 106 transmits a signal to the smart key fob 104 using an antenna 102 for inside the vehicle to authenticate the fob 104 and signal the ignition module 115 to start the engine of the vehicle.

The PKES can detect the presence of the smart key 104 while the vehicle is in use. Any loss of the smart key can signal an alert and restarting of the vehicle will not be possible if the smart key is no longer detected.

Figure 2:
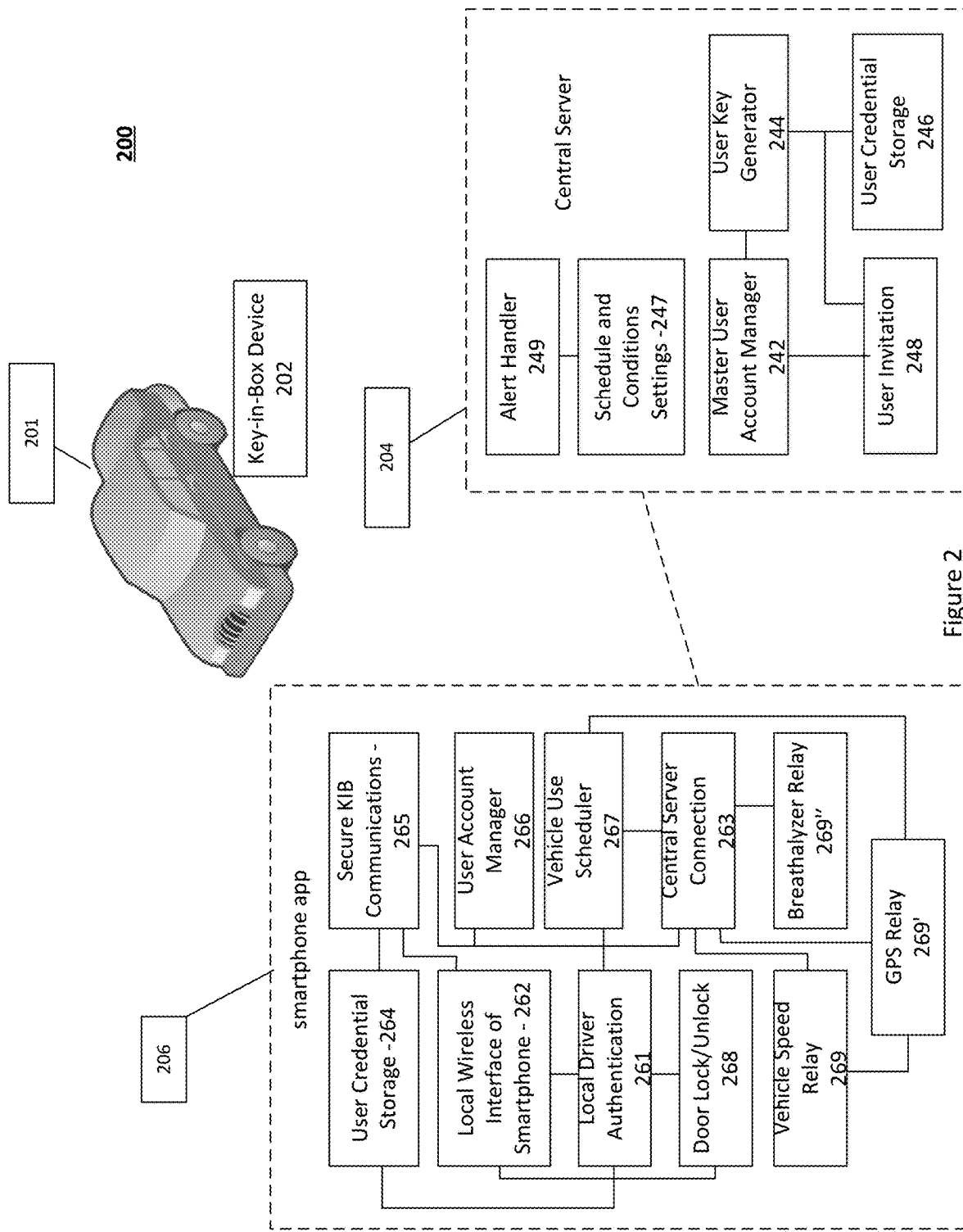
FIG. 2 is a schematic block diagram of an embodiment of a key-in-box (KIB) system including a smartphone app, a KIB device and a server used in controlling the system.

Referring to FIG. 2 illustrates a key-in-box (KIB) system 200 including a key-in-box device 202, an application 206 installed on a smartphone 112 (or other computing devices), and a server 204 used in controlling the system. This provides the admin user with the ability to obtain user keys from the server 204 and provide multiple smartphones with user credentials to communicate with the key-in-box device 202 to lock, unlock and start the vehicle 201.

In some embodiments, the server 204 may have a master user account manager 242 which can be set by the admin user through the use of a user interface (not shown here) or through the user account manager 266. This may be done by providing the information as indicated in the key-in-box device 202 such as serial number or provided upon purchasing the device or by pairing the application 206 with the KIB device 202 for the first time.

In some embodiments, the master user account manager module 242 can then provide the other users with access to the vehicle by creating user keys by a user key generator 244. While reference is made to keys, it will be understood that user credentials can comprise data other than encryption keys, such as secure passwords, a list of tokens, etc.

In one embodiment, the keys generated are associated with the key-in-box 202 as registered by the admin and can be recognized by the key-in-box 202. They can be stored on a user credential storage 246. The user credential storage unit 246 may store all the credentials received generated by user key generator 244 and use them to reconfirm or retrieve the credentials of the user at a later time. These permissions are reloaded when master user is in the car with network coverage.

In one embodiment, a predetermined number of user keys or tokens may be stored in the memory of KIB device 202 by the manufacturer allowing the master user to use them to set up multiple users without requiring connecting to the server 204.

In one embodiment, the user key generator 244 uses the identification information of the key-in-box device 202 to generate the user keys that are acceptable by the key-in-box device. In some alternative embodiments, the user key generator simply associates the identifier of the device 202 with the pre-generated user keys stored on user credential storage 246 and provides the admin user with keys stored for that specific KIB device upon receiving such request from the admin.

In some embodiments, a user invitation module 248 may be used to provide the new users having user keys generated for them with invitations to use the vehicle 201. This module may communicate with the mobile app 206 or alternatively directly with a computer device or smartphone of a driver/user and provide them with the invitation to use the vehicle. This invitation may be in the form of a user key to be used with app 206, if the app is already installed on the phone, or providing a server address to download an app with pre-authorization app to be installed on the smartphone. In an alternative embodiment, the invitation may be a code enabling the phone to directly connect with KIB device 202 and make the phone appear as the key fob is present.

In some embodiments, the server 204 may have an alert handler 249 which provides an alert for the admin (or other designated users) if the conditions and or schedules as set by a schedule and condition setting 247 are not respected. For example, a schedule for the use of the vehicle can include user reservations or reserved times, and if a vehicle is being used by another user in a manner that puts at risk the vehicle being made available for the user who made the reservation.

As shown, the smartphone app 206 may work with the local wireless interface 262 which is capable of communicating with the key-in-box 202. The local wireless interface can be a Bluetooth interface or other suitable local wireless interface. In some embodiments, a central server module connection 263 communicates over a data network with the server 204 and provides other modules with the user key and other data provided.

In some embodiments, the KIB device 202, after initiation or initial pairing (steps of which are explained in detail below), connects to the server 204 through the admin app 206 to get all the user keys generated. The KIB device 202 may connect to server 204 via smartphone frequently to update the user keys or other information as required.

In an alternative embodiment, the KIB device 202 may have a transceiver that is capable of communicating with the server 204 directly to receive the updated list of the user keys or directly provide the information as requested by the server 204. This may also be used by the admin to remove a driver's access to the KIB box 202 directly through the server without requiring the application 206 to be updated.

In another embodiment, a number of user keys are assigned to a KIB device and saved in the device memory (not shown here). Upon initiation of the KIB with the server 204, the server recognizes the authenticity of the KIB device using an identifier such as the serial number or MAC address and assigns the user keys allocated for that specific KIB device upon request by the admin.

In some embodiments, the application 206 only connects to the server 204 once to get the user key which is stored on an end-user credential storage 264. The user credential storage may be a part of the smartphone storage that is used by the app to store the user key.

In some embodiments, the KIB 202 may have a predetermined number of user keys pre-assigned to the "master user" and stored within the device in the car and master user smartphone.

In some embodiments, the user key is stored in an encrypted format using the encryption methods known in the art. In one other example, the application 206 has to connect to server 204 each time the user wants to use the vehicle 201 to confirm the user key. Furthermore, the application 206 and server 204 may frequently communicate and update any schedules and conditions that may apply to the user key accordingly. These updates may be saved and implemented by a vehicle use scheduler module which works with a user account manager 266.

In some embodiments, a local authentication module 261 may be used, after initiation of the device 202, to authenticate the identity of the user and smartphone by connecting to the KIB device 202 and checking whether the user is authorized. This allows an application 206 to authenticate a smartphone when there is no access to the server 204 such as in an underground parking.

The local authentication module 261 may also communicate with the vehicle use scheduler 267 to authenticate the driver and/or apply any particular conditions as required. A door lock/unlock module 268 may work with the local driver authentication 261 directly to allow locking and unlocking of the doors of the vehicles by the application 206. Module 268 can comprise program code that gives the user a button or buttons to send door (or trunk) lock and unlock commands via the interface 262 to the device 202.

In some embodiments, the application 206 may further have two relays 269, and 269', as shown in FIG. 2, to receive the speed, the GPS location of the smartphone, and thus correspond to the vehicle. While a relay 269" may be used to connect to a Breathalyzer to receive information about the sobriety of the driver. Breathalyzers can connect to a smartphone for measuring blood alcohol levels from breath and are known in the art. This information may be required by the app 206 to authenticate and provide the driver with access to the vehicle so that sobriety of the driver in ensured.

In some examples, it may be a required condition, as implemented by the vehicle use scheduler 267, to have the driver uses a Breathalyzer before the driver is authorized to use the vehicle. Similar conditions or limitations can be implemented such as limiting the speed of the vehicle or limiting the geographical limits for use of the vehicle using the relay inputs.

In some embodiments, the application 206 has a different version for non-admin drivers which does not include the user account manager 266 and vehicle use scheduler 267.

Despite the schematic illustration in FIG. 2, it would be appreciated by those skilled in the art that the modules as described herein may computer-readable instructions stored on the memory of the smartphone which when executed by the smartphone processor perform the different task and features in relation to different modules of the app 206 as described herein.

It will be appreciated by those skilled in the art that it is not necessary for the application 206 to work on a smartphone and any type of computing devices may be used to implement the details of the application as disclosed herein. In some embodiments, a user device 206 can be implemented as a fob device.

In some embodiments, a separate wireless remote key capable of working with the KIB system 200 may be used instead of the application 206 which may have all or partial features of the app 206.

The use of user keys can comprise the use of single-use tokens or codes so that the vehicle 201 can be used in the absence of a data connection to the server 204, for example when the vehicle is in an underground parking garage. In these embodiments, the device 202 is configured to allow driver authentication by using such codes, and to allow the vehicle to be driven without requiring connection to server 204. When a connection to the server 204 is restored, device 202 may then impose any driving conditions that were established with previous server communication. Alternatively, the device 202 can be operated in a stand-alone mode that does not involve a server 204. In such embodiments, the device 206 is used by a master user to configure users and the conditions and credentials for users are all stored in the device 202.

Figure 3:
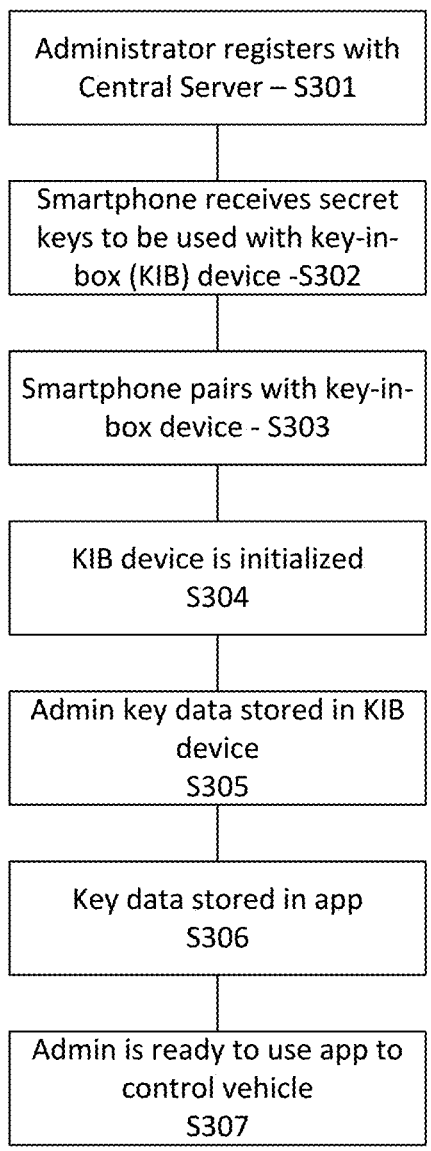
FIG. 3 is a flow diagram illustrating an embodiment of initializing a KIB system for a vehicle.

Referring to FIG. 3 now, it shows the flow diagram for initializing a KIB system 200 for a vehicle according to one embodiment of the present disclosure. This would provide protection against unauthorized pairing.

In step 301 (S301), an administrator (admin) register with the central server 204. Then in S302, the smartphone app receives secret user keys to be used with the KIB device 202. Then, as in S303, the admin would pair the smartphone app with the KIB device 202. In one embodiment, this may be done by pairing the application via Bluetooth connection to the KIB device. In some embodiments, this pairing may require physically pushing a physical button inside the box to allow such pairing. In S304, upon receiving the user keys, the KIB device is initiated and as in block S305 stores the user keys within the KIB device. In S306 and S307, the same user keys are also stored in the admin app 206 and the admin is ready to use the app to control the access and use of the vehicle.

Figure 4:
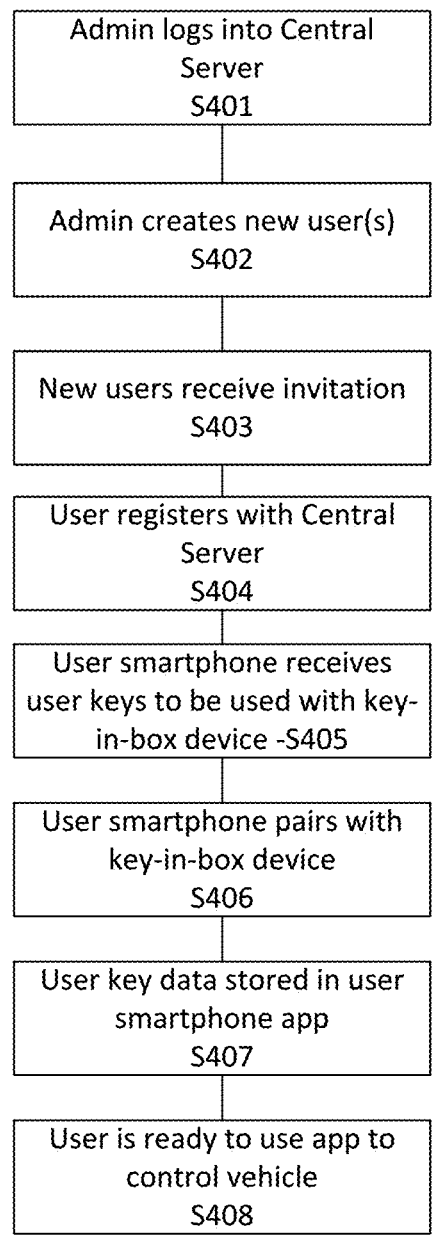
FIG. 4 is a flow diagram illustrating an embodiment of initializing a user of a KIB system for a user.

FIG. 4 shows the steps involved in authorizing a new driver by the admin. In S401 the admin log in to the server and then as in S402 creates a new user or driver on the server. In S403, the invitation module 248 sends out an invitation for the new user to register with the server 204. Upon registering with the server (S404), the new user's computing device receives a user key allowing the computing device or phone to be used with the KIB device 202 as in step S405. In step S406, the user pairs his/her smartphone with the KIB device. Then the user key is stored in the user smartphone app 206 (S407). Finally, the user is ready to use the app (S408).

Figure 5:
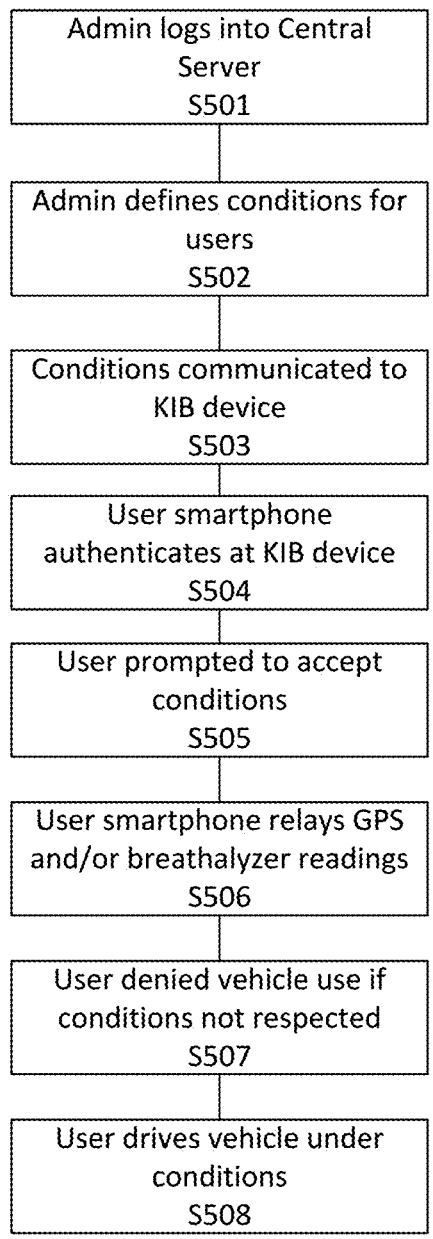
FIG. 5 is a flow diagram illustrating an embodiment of setting conditions for users of a KIB system and seeking consent from users.

As illustrated in FIG. 5, S501 to S508 are the steps the admin may take to set up conditions for one or more of the users to use the vehicle. To do so, the admin logs into the server 204, as in S501, and defines conditions for users (S502). The conditions may be communicated to the KIB device 202 so that the device 202 can be independent of the server 204 in applying the conditions. When the user is authenticated in step S504, they will be prompted to accept the conditions set by the admin in order to use the vehicle. These conditions may involve passing a Breathalyzer test or driving within a defined geographical boundary or geofence. Likewise, a condition may be to have the vehicle made available for another user by a given time and location. As in S507, the smart app may use relays 269, 269' and 269" to confirm the conditions as set by the admin and if the conditions are met the driver can have access to the vehicle. If the conditions are not met, access may be denied.

Figure 6:
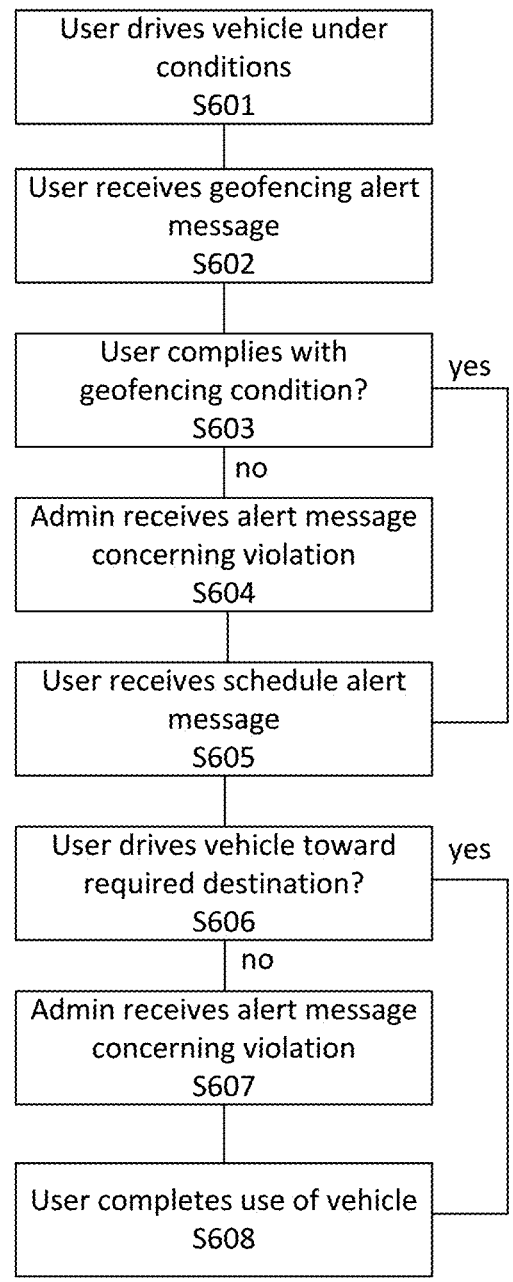
FIG. 6 is a flow diagram for steps involved in imposing driving conditions through a KIB system by way of alert messages in accordance with one embodiment of the present invention.

S601 to S608 of FIG. 6 as shown, explain steps the KIB system may take to impose driver conditions (geofencing in this example) in the KIB system 200 by way of alert messages. As illustrated, when a driver starts to use the vehicle under conditions, the steps of which are explained before, the driver will receive geofencing messages from the application 206. The KIB system then checks frequently the geographical position of the vehicle, using the GPS relay 269, to see if the geofencing conditions as set by the admin are respected. If the conditions are respected user/driver receives possible schedule alerts. If the conditions are not respected, the admin receives an alert message indicating a violation of geofencing conditions. The app then verifies if the vehicle is going toward the set destination if the driver is not in compliance the admin receives a message regarding the violation of the scheduling conditions.

It will be appreciated by those skilled in the art that the admin may set any other conditions, violation of which would lead to admin receiving an alert.

Figure 7:
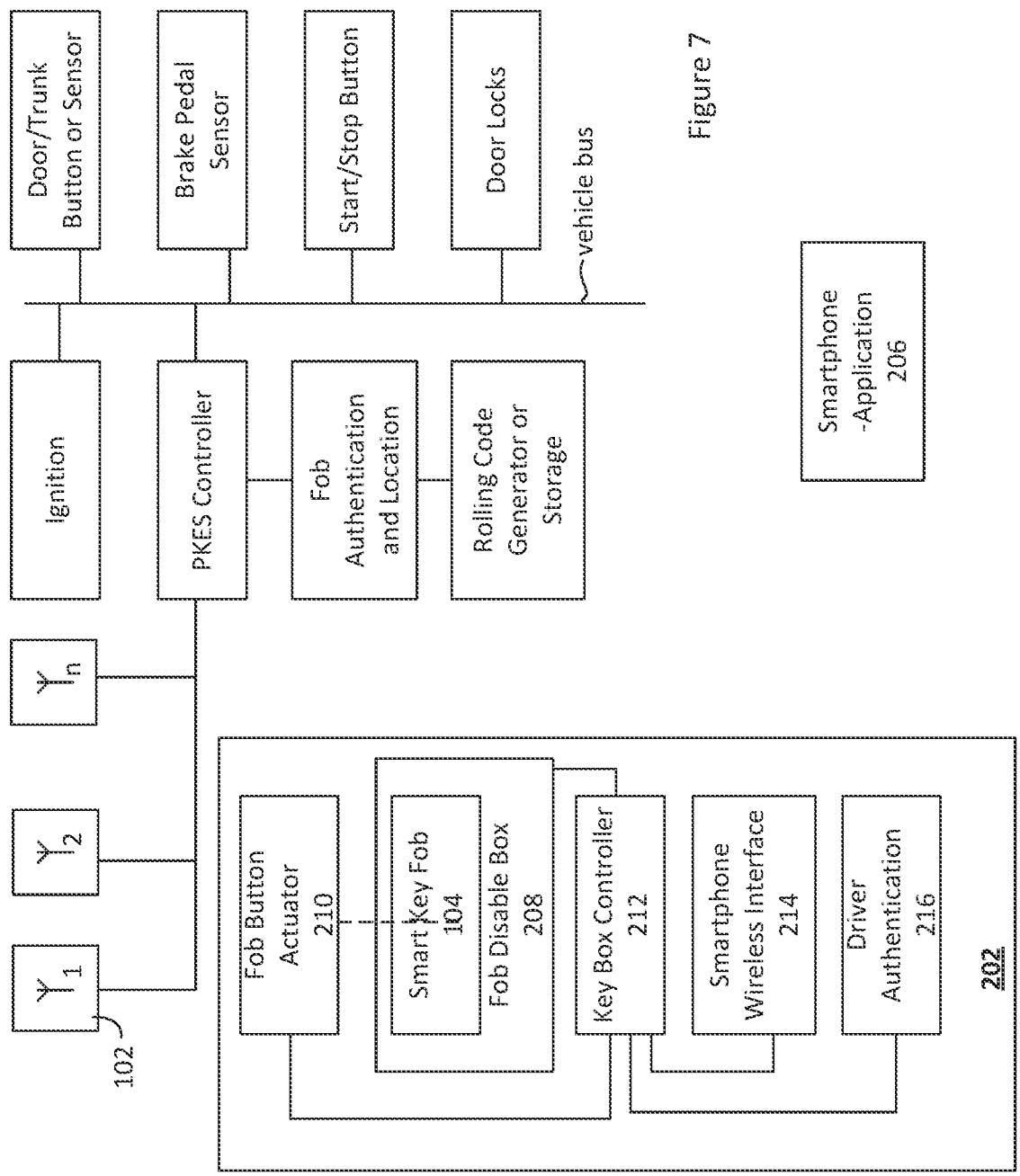
FIG. 7 is a schematic block diagram of a key-in-box (KIB) device associated with a PKES system in which the KIB device includes a smart key fob button actuator in accordance with one embodiment of the present disclosure.

Now turning to FIG. 7 showing the PKES system 100 working with KIB system 200 (only the KIB device 202 is shown). As illustrated the KIB device, 202 has fob disable box 208 which selectively or completely disables the communication between the fob 104 and vehicle 201. This may be achieved by different techniques such as controllably supplying power to the fob 104, using a box completely shielding any transmission from the fob 104 or using a signal-jamming transmitter 302. The key fob may be fixed in a position within the fob disable box 208 so that a mechanical actuator or electromechanical fob key actuator mechanism 210 can be used to push the buttons on the fob 104 remotely. A molded holder for the key fob or a crushable foam material can be used to hold the fob in position within the box. Various methods can be used to fix the fob 104 and optionally to actuate the button, examples of which are provided in this application.

Figure 12:
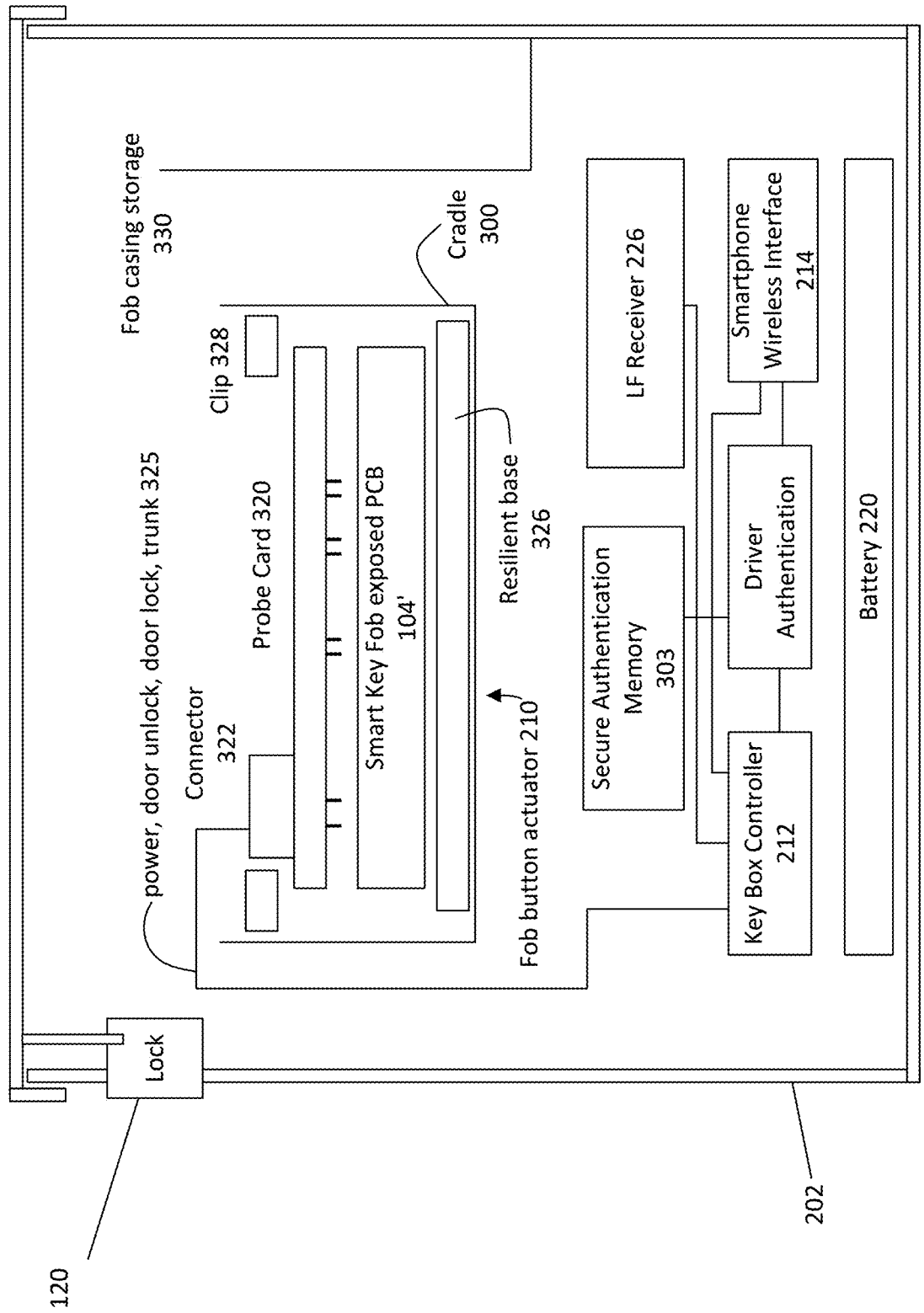
FIG. 12 is a side cutaway view of a KIB housing or enclosure with electronic components illustrated schematically in block diagram format in accordance with one embodiment of the present disclosure using electronic control of key fob switch contacts according to one embodiment of the present disclosure.
Figure 14A:
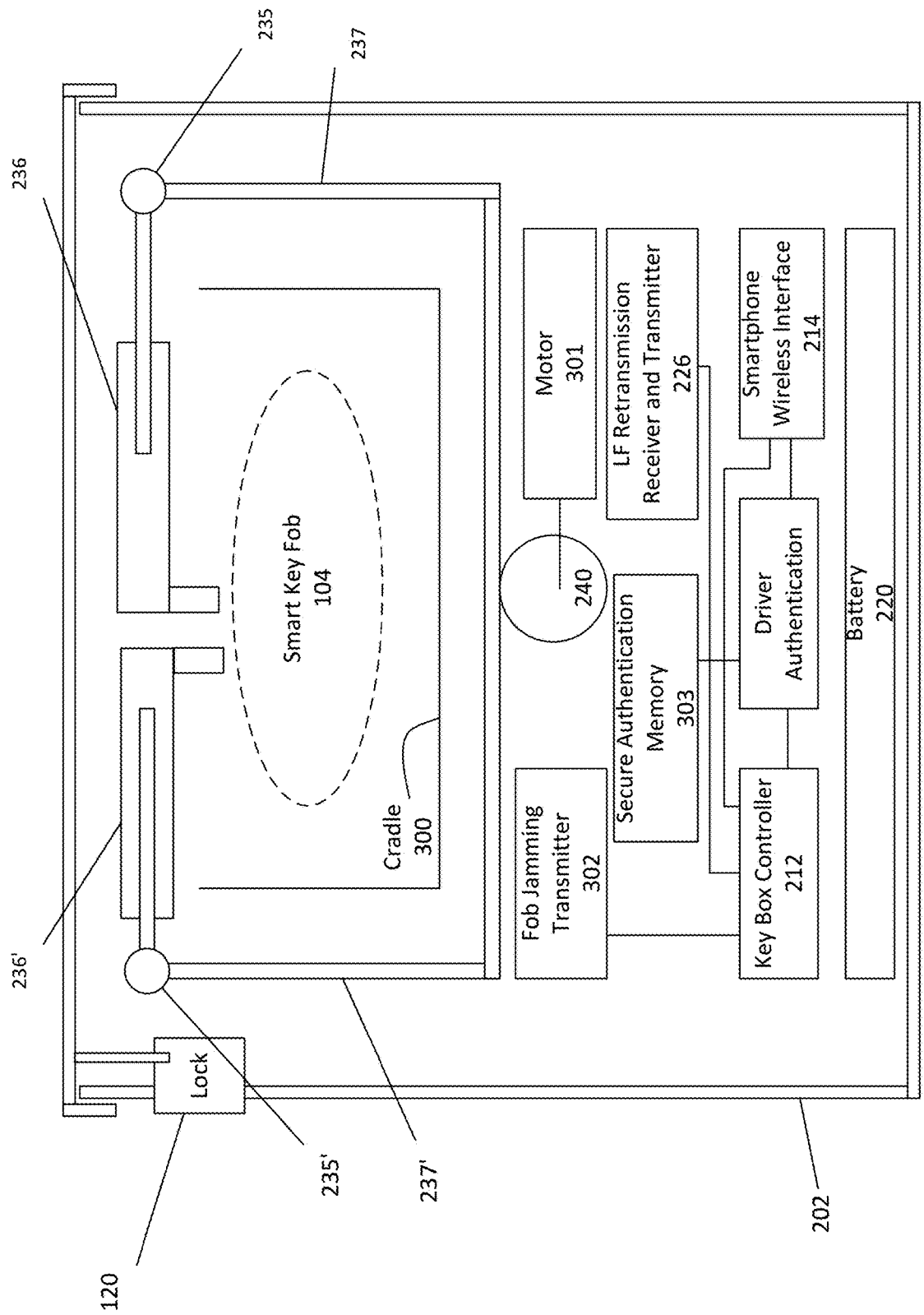
FIG. 14A is a side cutaway view of a KIB housing or enclosure with electronic components illustrated schematically in block diagram format in accordance with one embodiment of the present disclosure.

The KIB device 202 may further have a key box controller 212 that controls different parts of the KIB device including the fob button actuator 210 as shown in FIG. 12 or a fob button actuator mechanism 210 and the signal jamming transmitter 302, as shown in FIG. 14A (in the embodiments where it is where present). The KIB device 202 may also have a smartphone wireless interface 214 that can communicate with an app 206 to receive commands from the application 206 to open or close the vehicle door using the application 206. In such an embodiment, a driver/user may open the application 206 to actuate the fob button actuator 210.

The fob disable box may be a combination of box having switchable shielding and a jamming transmitter. In this way, the power of the jamming transmitter can be reduced and the use of the jamming transmitter can be avoided when the shielding is sufficiently to hide and to expose the fob 104 with respect to the vehicle.

Alternatively, shielding of the key fob 104 from PKES LF signals can be achieved by shorting the key fob's LF antenna using contacts, for example using probe pins of a probe card 320 as illustrated in FIG. 12. In this way, the key fob 104 will not receive selected LF challenge signals under the control of the KIB device 202. Furthermore, instead of retransmitting an LF challenge signal over the air for the LF receiver antenna of the fob 104, an LF challenge signal received by the KIB device 202 itself or by a receiver associated with the KIB device 202 can be provided to the fob 104 by directly connecting to the LF challenge receiver antenna contacts on the circuit board of the fob 104. In the example of FIG. 12, the probe card 320 would have probe pins associated with the LF receiver antenna of the fob 104' and would short and/or provide the LF challenge signal as required under the control of the controller 212.

The KIB device 202 uses a driver authentication module 216 which has the security features and encryption and is capable of communicating with the local driver authentication 261 of the app 206 to authorize access to the vehicle by a certain user/driver. The KIB device 202 can also have a memory 303, as shown in FIG. 14, to store all the user keys and other relevant information such as the conditions that apply to each user as explained in this application.

Despite the schematic illustration in FIG. 7, it would be appreciated by those skilled in the art that the controller 212 may be a processor reading computer-readable instructions from the memory which when executed performs the control features in relation to different elements of the KIB device 202 such as the fob button actuator as well as the activities of the box driver authentication module 216. This may comprise authenticating the user keys using asymmetric encryption methods.

It would be appreciated by those skilled in the art that throughout this application, the smartphone can refer to any computing device having the capability to work with the KIB box to authenticate the driver, perform the encryption decryption, such as a smartwatch, tablet or an alternative type of fob preprogrammed to perform the same tasks as the app 206.

In some embodiments, control of the vehicle requires the driver to have his or her smartphone on his or her person, however, may then not be required to take out and to use the interface of the smartphone to control the vehicle. This can provide a degree of convenience that is similar to the PKES key fob in that the smartphone, acting now as the effective vehicle key, can remain in the driver's pocket.

As described herein, wireless communication, e.g. using Bluetooth, between the smartphone and the KIB system can take place in the background operation of the smartphone so that the driver is authenticated to operate the vehicle. If such background operation was not available, the driver would need to use the smartphone interface to establish secure communications with the KIB system using the secure KIB communications module 265 for driver authentication, whether that authentication would use a driver password entered using the smartphone interface or authentication credentials previously stored within the app. As also described herein, driver authentication may also rely on communication with an authentication server.

When the smartphone interface is not used to control the vehicle, it is advantageous to detect the location of the smartphone to determine if the driver is inside or outside of the vehicle to ensure that the control action of the vehicle is appropriate. For example, when the driver is inside the vehicle, operation of the door locking and unlocking from outside the vehicle is advantageously disabled. Likewise, starting of the vehicle by a person in the vehicle is advantageously not be possible by the driver approaching the vehicle from the outside.

This wireless detection of the smartphone location can take various forms. A smartphone typically has WiFi, Bluetooth and NFC for local communications. Ultra Wide Band (UWB) communications are currently rare in smartphones, but this is expected to grow significantly in the years to come. NFC can be used, however the range is quite limited unless the antenna used is large. For the KIB system, installing a large antenna for operation at a distance can be a challenge. Bluetooth is practical as it consumes little power and is quickly put into operation. The ability to determine whether a smartphone is inside or outside a vehicle by using the signal strength of the Bluetooth signal is aided by the vehicle chassis acting as a signal obstacle. In some cases, a reliable determination is helped by providing an additional Bluetooth transceiver separated from the KIB system main housing. By comparing the signal strength of the two transceivers, a more accurate determination can then be achieved. If UWB is available, location accuracy can permit determining if the driver's smartphone is inside or outside of the vehicle using accurate ranging that is possible with UWB. Wifi can also be used to determine the location of a smartphone, however, establishing a connection between the smartphone and a WiFi access point in the KIB system takes a number of seconds. While a WiFi connection can be initiated by detecting the Bluetooth connection with the KIB system, causing a smartphone to drop its current WiFi connection in favor of the KIB system's access point can be disruptive to the user of the smartphone.

For access to the vehicle, a trigger is required for the KIB system to know when to unlock the vehicle since the smartphone interface is not used for this purpose. There are a number of possible triggers that can be used.

A first one is to use the signal strength or the direction of the transmission from the smartphone so as to determine that the driver is at the door, and to respond by unlocking the door. This first type of trigger has the disadvantage that walking around or by the vehicle can trigger an unintentional unlocking of the vehicle. While automatic relocking of the vehicle can be done when the smartphone is not detected inside the vehicle within a short time interval, the unintentional unlocking can still be undesirable in certain cases.

A second trigger can be for the KIB system to use a suitable receiver to detect the LF challenge transmission sent by the PKES system resulting from the driver touching the door handle or pressing a button on the door. The KIB system can respond to this LF challenge transmission in various ways. One option is to have the KIB system use a fob door unlock signal to cause the PKES system to unlock the doors. This can take the form of a mechanical actuator to push the fob's door unlock button, or an electronic actuator connected to the circuit board of the fob to close the fob's door unlock button circuit. This option does not depend on how a vehicle's detection of the fob response operates. As long as the challenge transmission can be detected by the KIB system, the trigger is made available. Another option is to involve the transmission of stored door unlock codes obtained from the fob. This option can depend on how a PKES system responds to stored codes.

Another option is to control the fob to provide a wireless response to the challenge in a way that makes the PKES system believe the fob is outside the vehicle. This option can depend on how the vehicle PKES system determines the location of the fob. If a vehicle uses a number of challenge transmission antennas (as shown schematically in FIG. 7 there are n such antennas 102 in different locations within the vehicle) in a sequence to transmit the challenge at different times, the timing of the response is used by the PKES system to determine the location of the fob. In this case, the KIB system can cause the fob to respond in a manner that appears to be a response by a fob located outside the vehicle. This typically involves shielding or disabling the fob and then repeating the LF challenge transmission to the fob so that its wireless response can be received by the PKES system. To do this correctly can be different for various PKES systems. Some PKES systems involve including the signal strength of the LF challenge transmission as received by the fob in the fob's response transmission. This allows the PKES to handle the case that a fob would detect the challenge transmission weakly from the antenna inside the vehicle. The LF challenge transmission sent from the antenna located at the door may not be detectable at the KIB system's main housing storing the fob, and thus a KIB system repeater module locate on the door may be required. A repeated challenge transmission may be amplified so that the signal strength received by the fob is similar to that on the outside of the vehicle in proximity to the door.

A third trigger is an additional transmitter that can be mounted to the vehicle door. This can take the form of a small module having a battery, switch and transmitter that can be packaged and adhered to the inside of a door handle or on a door next to the door handle. The wireless trigger signal can be received by the KIB system. The additional transmitter can be a Bluetooth transmitter, in which case the KIB system does not need an additional receiver, however other frequencies and transmission protocols can be suitable even if a separate receiver in the KIB system is then required. A variant of a wireless trigger signal transmitter module can be a wired module connect to the KIB system. One option for this can be a capacitive fringing field sensor mounted or adhered to the inside of windshield so that the driver can place a hand over the sensor to cause the trigger to operate. When the driver's smartphone authenticates with the KIB system and is determined to be external to the vehicle, the door lock/unlock operator can take place.

When the KIB system is directly controlling the door lock/unlock action, the KIB system will store in memory whether the vehicles doors are locked or unlocked, so that it can respond to the trigger signal to perform the opposite of the current state. Also, when the KIB system detects that the driver has left the vehicle and is out of range, the KIB system may cause the vehicle doors to lock. This can be set as an option by the user, since causing the vehicle to lock can result in locking a passenger in the vehicle.

Figure 8:
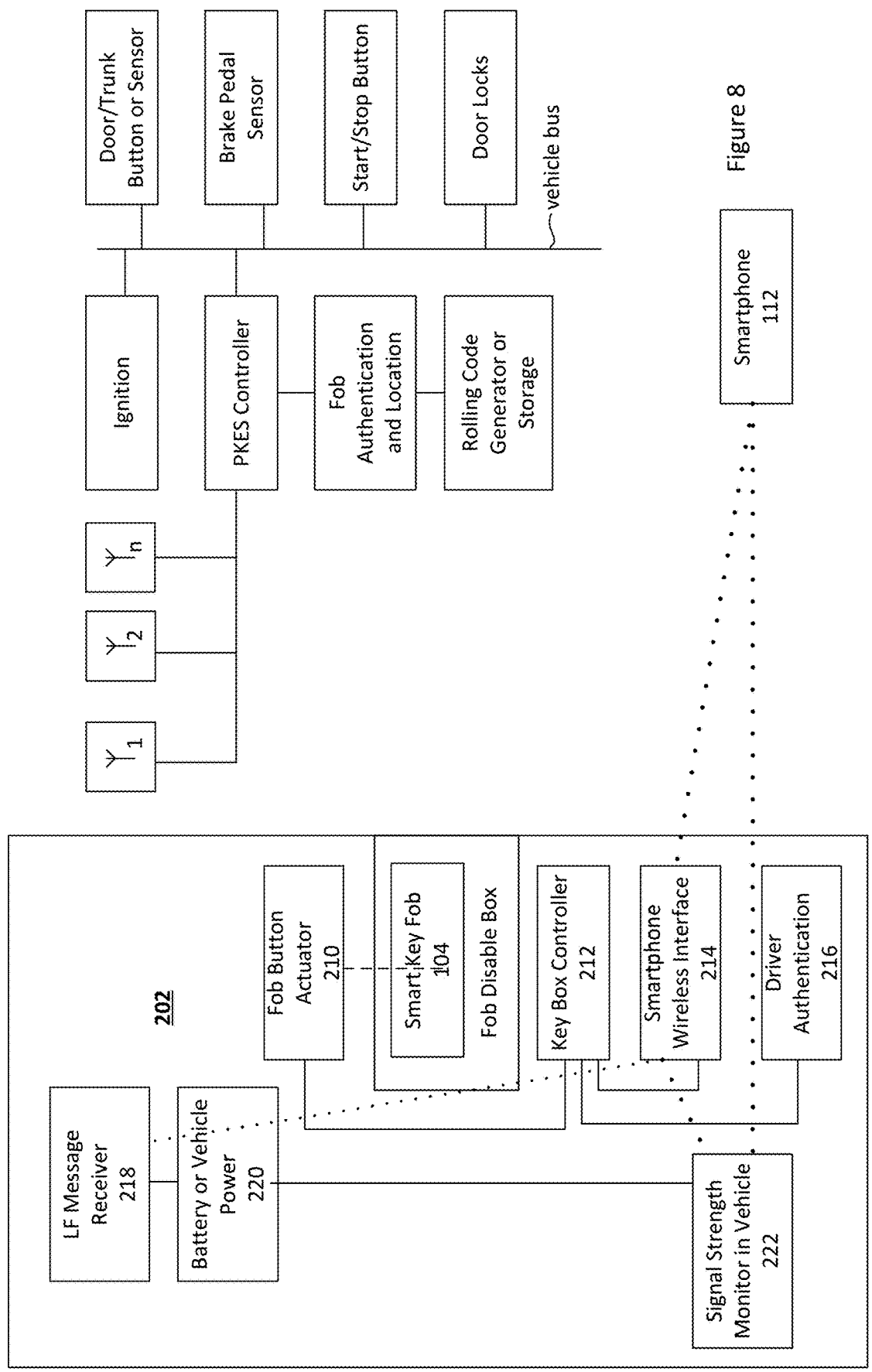
FIG. 8 is a schematic block diagram of a key-in-box (KIB) device associated with a PKES system in which the KIB device includes a low-frequency receiver and re-transmitter in accordance with one embodiment of the present disclosure.

FIG. 8 shows an alternative embodiment of the KIB box 202 wherein opening the vehicle door does not require use of the smartphone app 206. Instead, a receiver 218 is provided in the vehicle, for example plugged into the OBD interface, so as to receive a wireless message from the vehicle when the exterior door button is pressed. Receiver 218 can then send a signal to the controller 212 via the wireless interface 214. If the user is authenticated, the controller 212 will cause the actuator 210 to push the door open button on the fob 104 in the box and open the vehicle door. Starting the vehicle can require the user to accept any conditions imposed on the driver.

In the illustration of FIG. 8, the fob button actuator 210 also can react based on the presence of the smartphone inside or outside the car. In this manner, the KIB device would only allow the unlocking of the door, using the outside buttons, if it senses that the smartphone is outside the vehicle. Likewise, it would not allow the user to lock the vehicle door from the outside when the smartphone is sensed to be inside the vehicle, and it may sound an alarm to let the driver know that the smartphone is inside the vehicle. When a user touches the door button on the vehicle, the car sends out a signal to locate the smart key fob 104, the receiver 218, which may be a low-frequency message receiver, picks up the signal sent by the vehicle 201 and relays that to the KIB controller 212. The controller 212 may then check to see whether the smartphone is located inside the vehicle 201 or outside. This is done using the signal strength monitor sensor 222 which is located inside the car. In one embodiment, the signal strength monitor sensor may be a simple Bluetooth sensor measuring the strength of the signal received from the smartphone. The monitor 222 can be packaged with the receiver 218 if desired. One of the benefits of this embodiment inter alia, is that it allows the KIB device and system to work with the vehicle buttons without requiring it to have a connection into the vehicle bus and wiring. However, in some embodiments, as further explained in this application, it is possible to instead of using the LF message receiver 218, directly connect the KIB device 202 to the vehicle wiring and use the signal indicating the actuation of the door button or other sensors directly from the vehicle electric.

Figure 9:
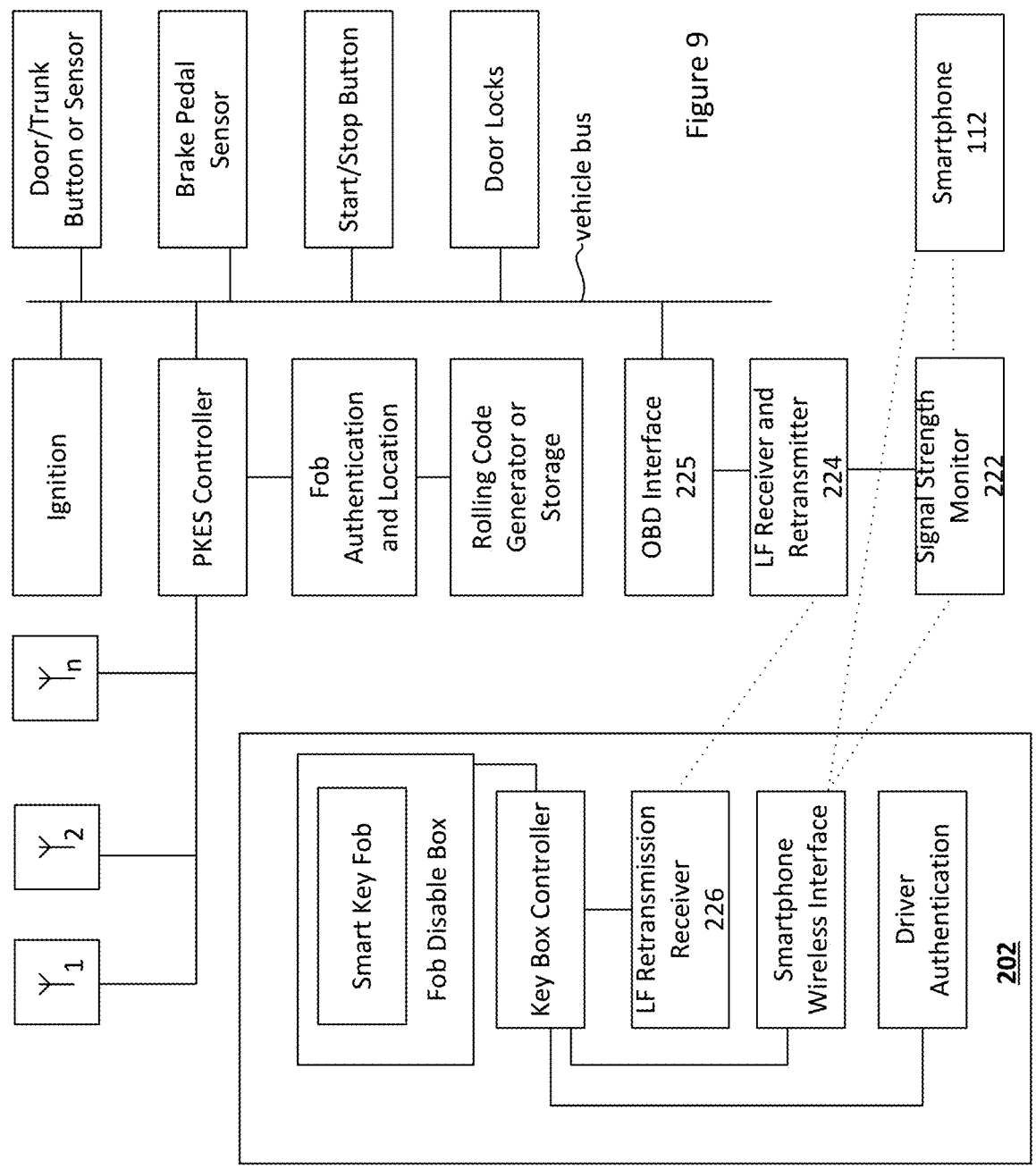
FIG. 9 is a schematic block diagram of a key-in-box (KIB) device associated with a PKES system in which the KIB device includes a low-frequency receiver and re-transmitter with a door lock/unlock controller connected to the vehicle for controlling locking and unlocking of the vehicle doors in accordance with one embodiment of the present disclosure.

FIG. 9, shows an embodiment of the KIB device 202 in which the proximity of the smartphone having the authenticated application 206 solely or in combination with a user pushing a vehicle door button, trying to open the car or sensing the presence of a user's body close to a door. In this embodiment, the KIB 202 has an additional LF receiver and re-transmitter 224 that connects to the OBD interface 225 of the vehicle. When a user pushes a door button or touches the door handle, one of the antennas 102 sends out a signal to detect the presence of the key fob 104. The LF receiver and transmitter 224 receive this signal from the vehicle OBD 225 and retransmits the signal to an LF retransmission receiver 226 which relays the signal inside the fob disable box 208 and to the embedded fob 104. As a result, the embedded fob 104, responds to the signal as sent by one of the antennas 102 of the vehicle causing the controller 106 to cause the vehicle door to open. The controller 212 makes sure that the relay of signals from the vehicle 201 to the fob 104 only happens when an authenticated application or device is present.

In some embodiments, the strength of the signal retransmission may show to the fob 104 the distance from the vehicle 201.

Figure 10A:
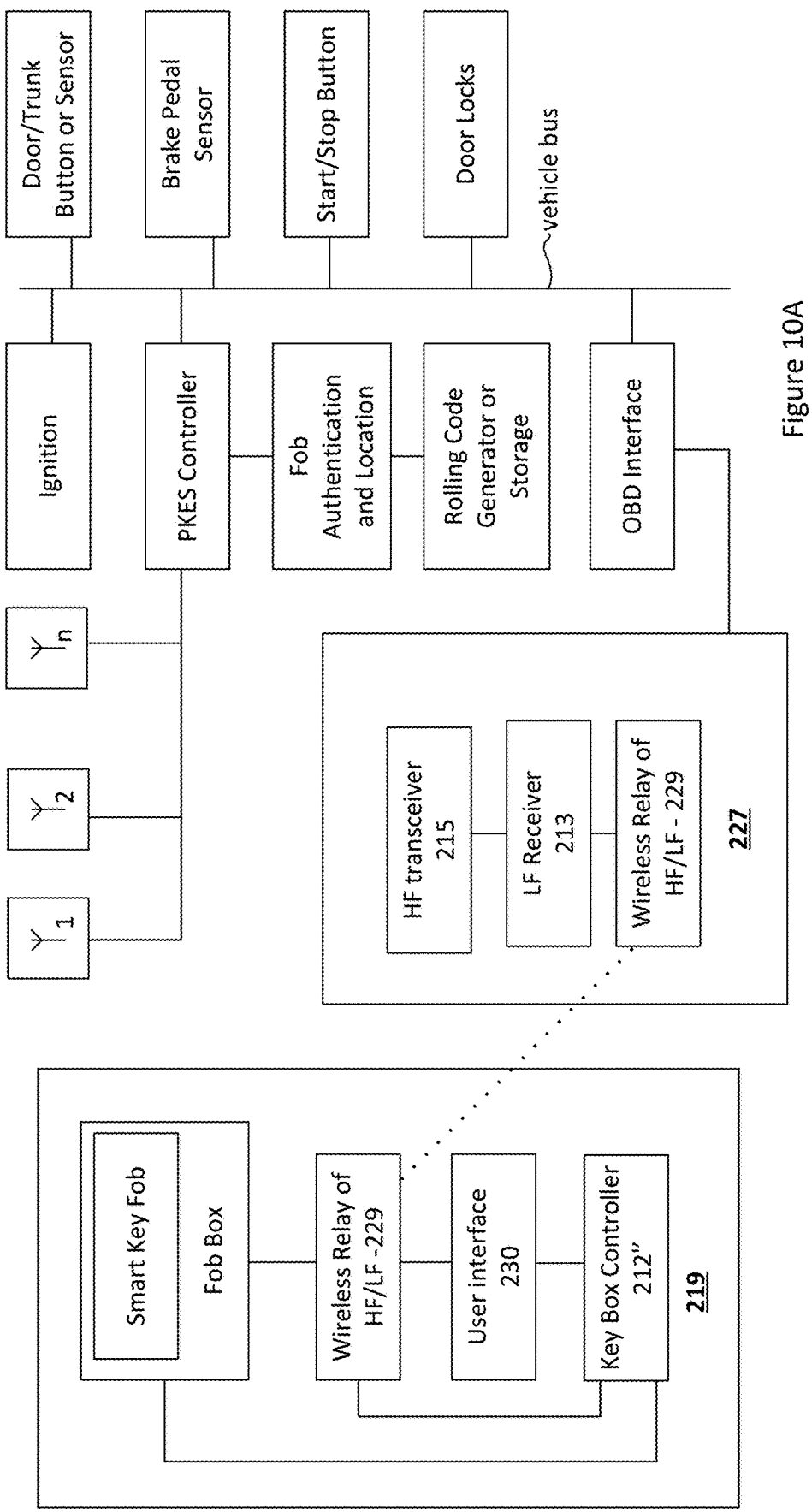
FIG. 10A is a schematic block diagram of a key-in-box (KIB) system controlled by an admin wherein a key fob associated with a PKES system is outside a range of the PKES system located and communicates with the vehicle with a wireless relay in accordance with one embodiment of the present disclosure.

Referring now to FIG. 10A illustrating an embodiment of the KIB device 202 may have two parts, a vehicle unit 227 and a key storage unit 219. In this embodiment, the smart key fob 104 is located outside the vehicle 201 in a storage unit 219 which may be at a distance out of the range of the vehicle's PKES which allows the system to work without any signal-limiting elements such as the signal jammer 302. The storage unit may hold multiple key fobs for multiple units.

In some embodiments, the vehicle unit 227 may have a HF transceiver 215, an LF transceiver 213 and a wireless relay 229. In this embodiment, the relay 229 receives key fob signals and the LF and HF transceivers send it to the vehicle to allow a user to operate the vehicle. The relays 229 can use a low latency wireless connection having sufficient bandwidth to relay the HF and LF signalling. While a short range point to point wireless transceiver can be used, short range WiFi or a suitable wireless network, such as 5G technology may also be employed.

In this embodiment, the driver may not need a mobile device and an administrator can use the user interface 230 and the controller 212" working with storage module 219 to allow a driver to have access to the vehicle. Alternatively, driver authentication can involve a computing device of the driver as used in other embodiments. However, the fob 104 (inside of unit 219) does not need to located on board the vehicle, and instead can be securely stored in a building or residence.

It would be appreciated to those skilled in the art that although the interface 230 and the controller 212" have shown to be a part of the storage unit 219, they can be a separate computing system such as a personal computer or mobile (controlled by an admin) connected to the storage unit 219. Furthermore, in some embodiments, the interface 230 may be a part of the app 206 and be used for controlling the storage unit 219.

As illustrated in FIG. 10B, in some embodiments, the vehicle unit 227, may have components such as the smartphone interface and driver authentication module, and a vehicle unit controller 228.

In this embodiment, the key fob storage unit 219 may store one or more key fobs for multiple vehicles. The storage unit may also have fob button actuator 210 in which case for each key fob a separate cradle and fob button actuator may be required. If the storage location of the unit 219 is far enough from any of the associated vehicles, then disabling of the fob 104 in the unit 219 can be optional. Thus, in a home installation, unit 219 can be located in a room in the home at a distance from the garage or driveway. Unit 219 can be operative to relay the HF/LF communications between the vehicle unit 227 and the fob 104 to allow the vehicle to be used by an authorized user.

The vehicle unit may further include the LF transceiver 213 and the HF receiver 215 which receive the LF and HF challenge from the vehicle and send them to a wireless relay transceiver 229. The wireless relay transceiver 229 receives LF and HF challenges over the same or different frequency to the wireless relay transceiver 229' which send the HF and LF signal to the key fob 104 and receives the key response and relays it back to the relay 229 which sends it back to the HF transceiver 215 and the LF transceiver 213 that send it back to the car allowing an authenticated user to use the vehicle. The controller 228 makes sure that the relay 229 does not relay the LF and HF signal when the driver is not authenticated.

Although it has not been shown in the drawings 10A and 10B, it would be appreciated by those skilled in the art that, the storage unit 219 has an LF transmitter and/or and HF transmitter embedded which is used for transferring the signals from and to the relay 229' and the key fob 104.

In one embodiment, the vehicle unit 227 may be a compact module that may be connected to the OBD interface 225 of the vehicle.

In some embodiments, the fob box 208 connected to the controller 212 is used to control communications and other functions of the fob box 208. In some embodiments, the interface 230 connects to a computing device (not shown here) or embedded in a computing device that controls the activities of the fob box 208 and that of the wireless relay of HF/LF 229'.

In this embodiment, when a user/driver tries to open the door and start the vehicle 201, the LF transceiver 203 and HF transceiver 215, which is onboard the vehicle 201, receive the LF and HF challenge signal from the vehicle and send it to the relay transceiver 229 which send it to a relay transceiver 229' of the storage device 219. The two relays may communicate in any chosen frequency which may be equal or different with the HF frequency.

The signal received by the relay transceiver 229' is then communicated to the fob box 208'. The respond from the fob in box is then communicated back to the wireless relay of HF/LF and to the vehicle to allow operation of the vehicle.

In another embodiment, an administrator may be able to use the interface 230 to send a signal and allow the vehicle to be operated by a driver user even if the user does not have an authorized device. In this embodiment, the relay 229' may send a signal to the relay 229 to have the transceiver send a signal allowing the user/driver to operate the vehicle.

In some examples of this embodiment, the fob box 208' does not need to block, jam or disable the signal of the smart key fob 104 as the location of the smart fob 104 may be far from the vehicle 201 to allow it to communicate with the vehicle without using the first wireless relay 229. An example of such setting would be a car dealership where all the fob keys of different vehicles may be held in one or multiple fob boxes 208' and upon request the user interface 230 may be used by the dealership operator to authorize opening of a specific vehicle by allowing the first wireless relay 229 to communicate the signal it receives from the smart key fob 104. When a user is authorized to use vehicle 201, the user can drive the vehicle but upon stopping the vehicle, the driver won't be able to restart it. This feature has the advantage of making sure that even when a vehicle is stolen, the key fob 104 is not embedded inside the vehicle.

It will be appreciated to those skilled in the art that when a user is allowed to operate, when the key fob is not in range and a relayed signal is used, the operator either has to stay in the range of the relay 229' or it's permission to use the vehicle will end when it switches off the vehicle outside the range and wont be able to continue using the vehicle as it would not be receive the relayed signal from relay 229' allowing the driver to use and operate the vehicle.

It will be appreciated by those skilled in the art that this embodiment of the KIB system may benefit from all the elements as described in other embodiments, including but not limited to having the fob button actuator 210, connection with the server 204 and application 206, etc.

In some embodiments, the KIB system shown in FIG. 10 may have an interface application capable of managing multiple key fobs at the same time. This interface application can be provided directly to the user to be installed on a computing device or can be platform provided via the server 204 or an independent online server. In one embodiment, the interface application may be embedded within the application 206.

Figure 11A:
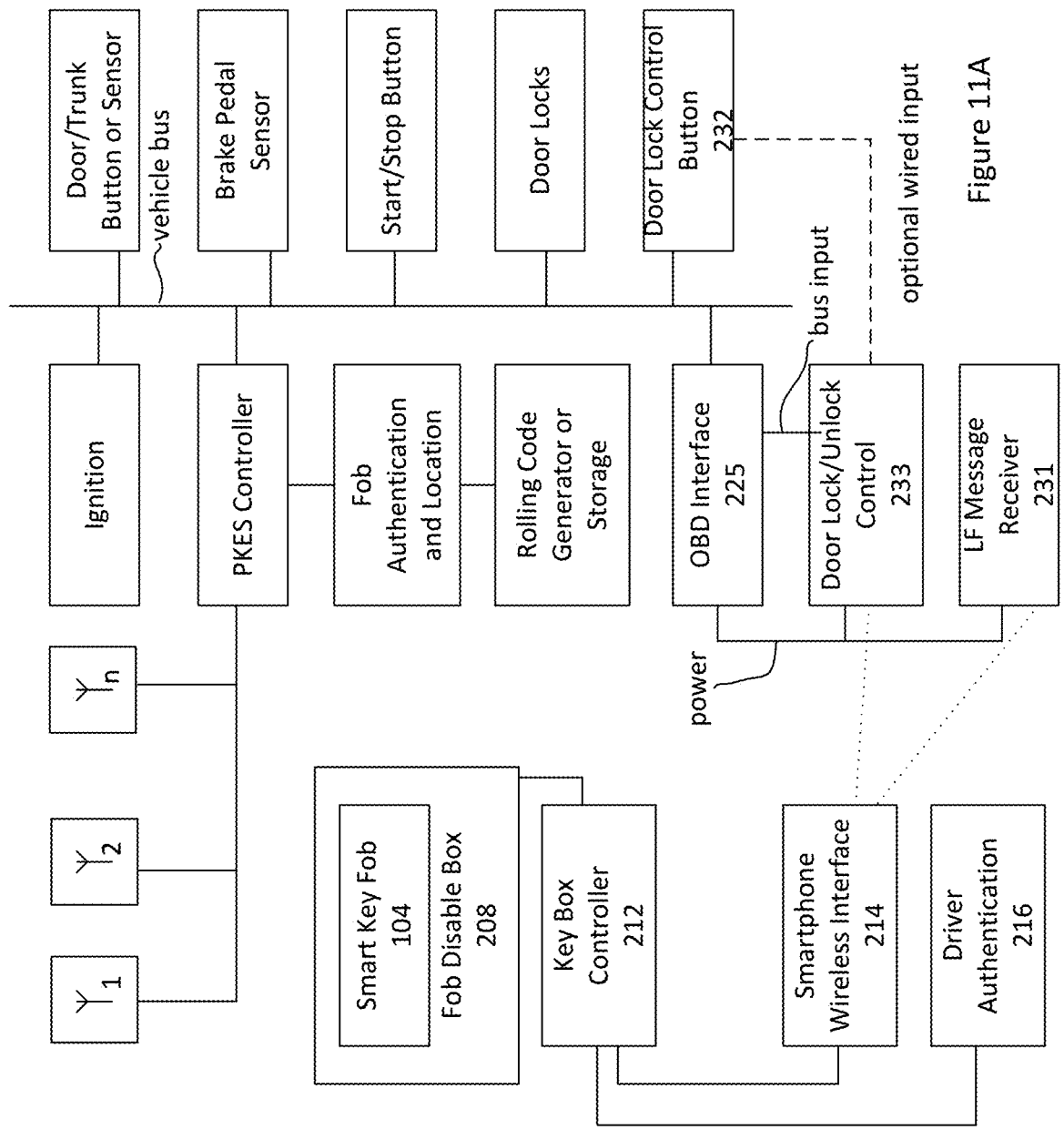
FIG. 11A is a schematic block diagram of a key-in-box (KIB) device associated with a PKES system in which the KIB device can communicate with the vehicle interface and/or the physical switches in the vehicle to unlock or lock the doors in accordance with one embodiment of the present disclosure.

FIG. 11A illustrates an embodiment of the KIB system wherein the KIB device 202 directly communicates with the OBD interface 225 of the vehicle 201 through an LF message receiver 231.

The smartphone wireless interface 214 communicates with the receiver 231 which is connected to the vehicle OBD interface 225 and allows an authenticated user to open, close or operate the vehicle. In this embodiment, the message receiver 231 received the actuation of the door button from the OBD interface and communicates it to the interface 214 of the KIB device 202. The KIB device the reacts by having the key fob send the appropriate response accordingly.

In some embodiments, the system further has a separate door lock/unlock controller 233 that connects to the vehicle OBD interface 225 directly or via a bus input of the vehicle which communicates with the smartphone wireless interface 214. This allows the KIB system to control the actuation of lock/unlock buttons of the vehicle.

In one embodiment, the door lock/unlock controller 233 connects to the vehicle door lock control button 232 via a wired input.

FIG. 12 is an example of a KIB main unit 202 that includes a fob button actuator 210 that uses electronic switches to control the fob 104. The casing of the fob 104 is opened to expose the fob circuit board 104'. Optionally, the removed casing part or parts can be stored within unit 202 in a compartment 330. The control switches can be integrated into the probe card 320 or they can be part of the controller 212. The probe card is a card that matches the circuitry of the fob board 104'. It will be understood that when the fob board 104' has power and/or switch traces on both sides, the probe and/or power contacts can be provided on both sides. Probe pins can be used to connect with traces on the board 104'. The probe card 320 may use conventional probe pins used in electronic PCB testing. The control over power and door lock/unlock buttons by controller 212 is made possible by this configuration. A resilient base 326 may support the board 104'. A clip or clamp mechanism 328 can be used to maintain contact between the probe card 320 and the board 104'. The mechanism 328 can use screws or other suitable fasteners. A standard cable connection including a connector 322 between controller 212 and probe card 320 can be used.

In the embodiment of FIG. 12, it is possible for the trigger to be the LF challenge transmission sent by the PKES system in response to activation of a door handle button or sensor. An LF receiver 226 can be used for this purpose. As previously discussed, the response to the LF trigger can be to use actuator 210 to transmit a fob button command to lock or unlock the vehicle, instead of providing a fob response to the PKES system.

In vehicles that offer fob buttons for trunk opening and closing, the probe card may also provide probe pin contacts for this switch as well. To control specifically the trunk operation and not door lock/unlock, the smartphone app interface may be used. In the case that the trunk is to be opened by the driver while in the vehicle so that the trunk can be used by a passenger being picked up or receiving goods at a store, this is a convenient option. Additionally or alternatively, the location of the driver's smartphone may be determined to be at the trunk area, and the usual trigger can then be used to actuate the trunk button instead of the door button.

Figure 13A:
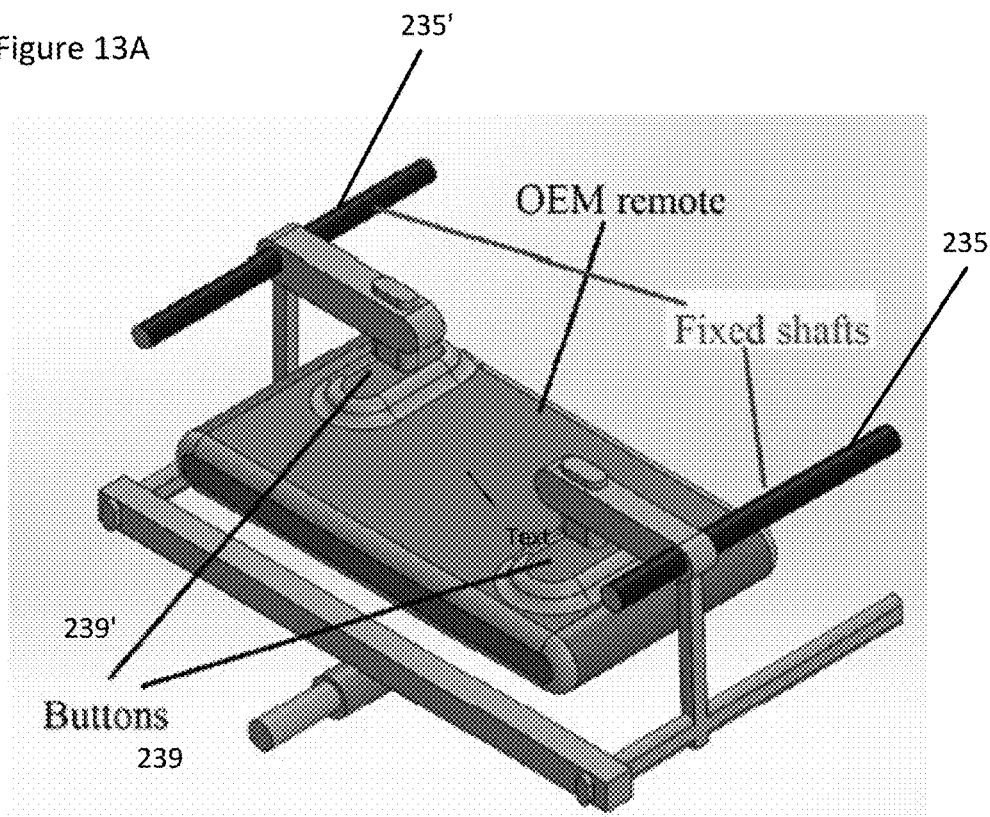
FIG. 13A is a perspective view of an electromechanical key fob actuator according to one embodiment of the present disclosure.
Figure 13B:
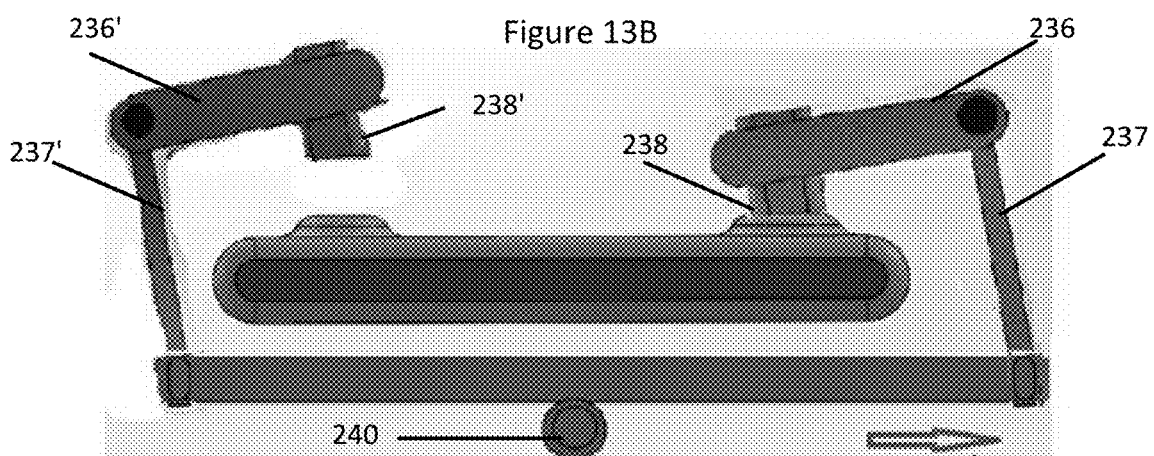
FIG. 13B is a side view of the electromechanical fob key actuator of FIG. 7 in a first button depress state in accordance with one embodiment of the present disclosure.
Figure 13C:
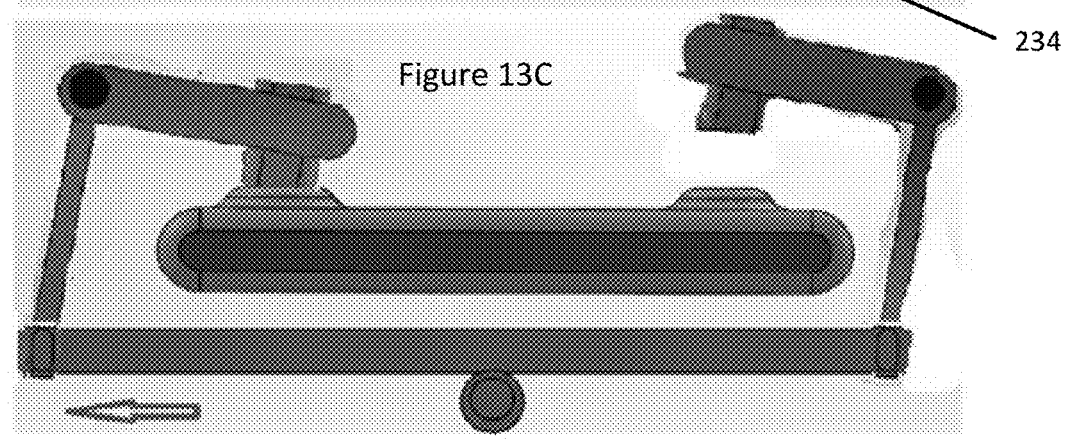
FIG. 13C is a side view of the electromechanical fob key actuator of FIG. 7 in a second button depress state in accordance with one embodiment of the present disclosure.

FIG. 13A is an example of an electromechanical fob key actuator mechanism 210. As illustrated in FIGS. 13 to 14, the key fob 104 is fixed directly or indirectly in a cradle 300 (Shown in FIG. 14A) within the fob disabling box 208. A rack 234 can connect to two support structures 237 and 237' at one end and provides support for two shafts 235 and 235'. The two telescopic arms 236 and 236' can be coupled to the shafts 235 and 235'. The coupling allows the shafts 236 and 236' to move along the length of the shafts 235 and 235 but maintains the angle between the support members 237 and the telescopic arms 236. Also, the telescopic arms 236 and 236' may extend from the fixed shafts 235 allowing adjustment of their length. This would allow a user to adjust the position of the ends 238 and 238' so that they are at least partially on top of buttons 239. The ends 239 may be a separate element that is adjustable in length or an integral part of the telescopic arms 236. A pinion 240 and the rack 234 form a rack and pinion mechanism so when a pinion motor 301 rotates the pinion the rack moves to the right or left relative to the pinion causing the buttons to be pushed as illustrated in FIGS. 13B and 13C.

Returning to FIG. 14A, it shows an example of the KIB device 202 wherein the components are all locked inside the fob disable box 208 using a lock 120. In this example, a fob jamming transmitter 302 is used to selectively limit the communication between the fob 104 and car 201. The battery 220, the smartphone wireless interface 214, the memory 303 and all other components as illustrated can be inside the fob disable box 208, as is equally possible in the embodiment of FIG. 12. It will be appreciated by those skilled in the art that in other embodiments, these components can be outside the fob disable box 208. Also, the KIB device may connect directly to the vehicle power system or have its battery charged by the vehicle. Furthermore, different power sources may be used for different components as required for the design of the device.

Figure 14B:
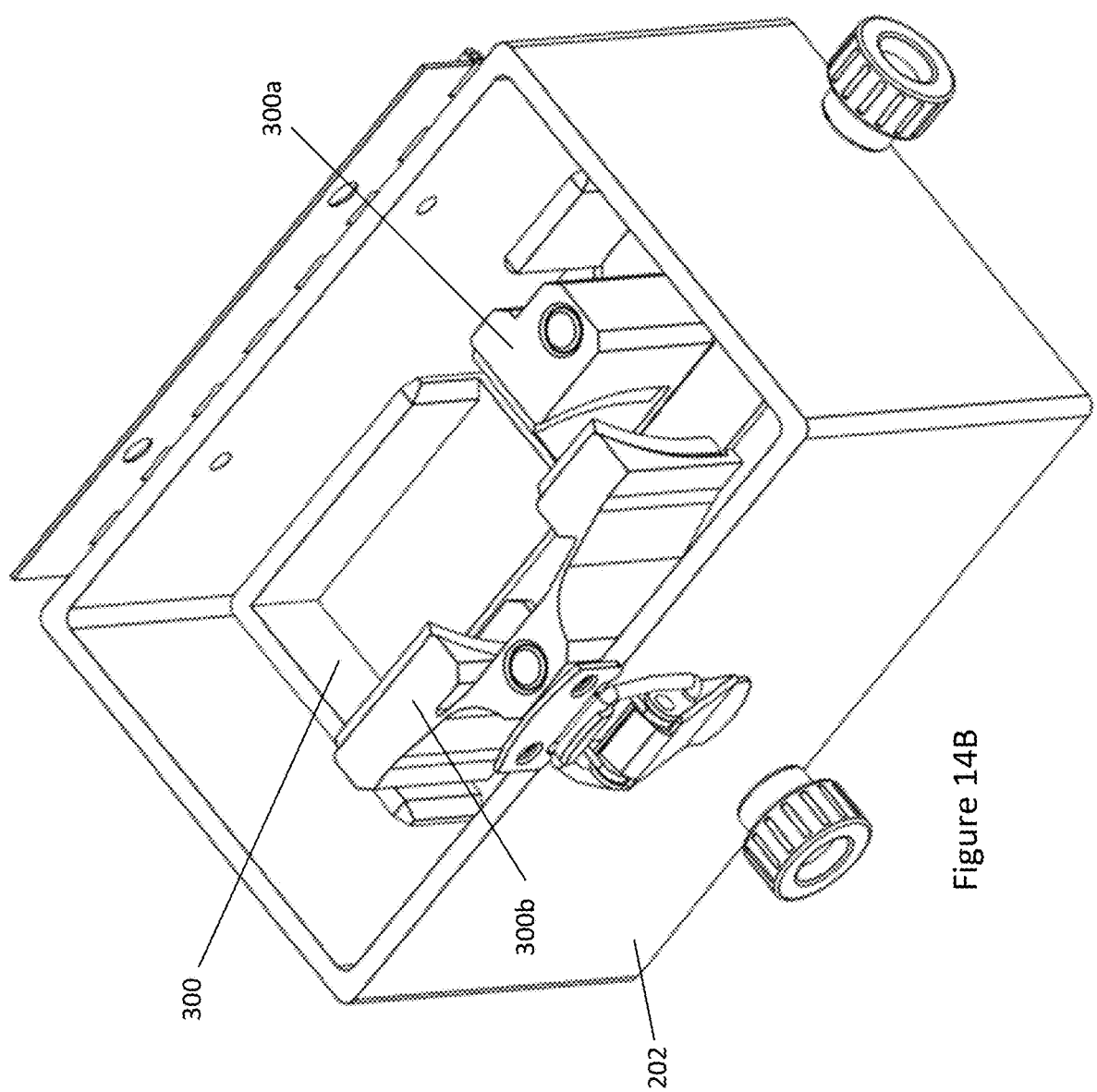
FIG. 14B illustrates an embodiment of the electromechanical fob key actuator mechanism wherein two motors move the actuator.

FIG. 14B illustrates an embodiment of the cradle 300 in a box that has two clamping members 300a and 300b for pushing against one end and one side of the fob (not shown) by turning the respective knobs. As illustrated, the members 300a and 300b can be curved to cup the fob, and they can have a rubber or foam covering so as to better secure the fob against the corner member of the cradle 300.

Figure 14C:
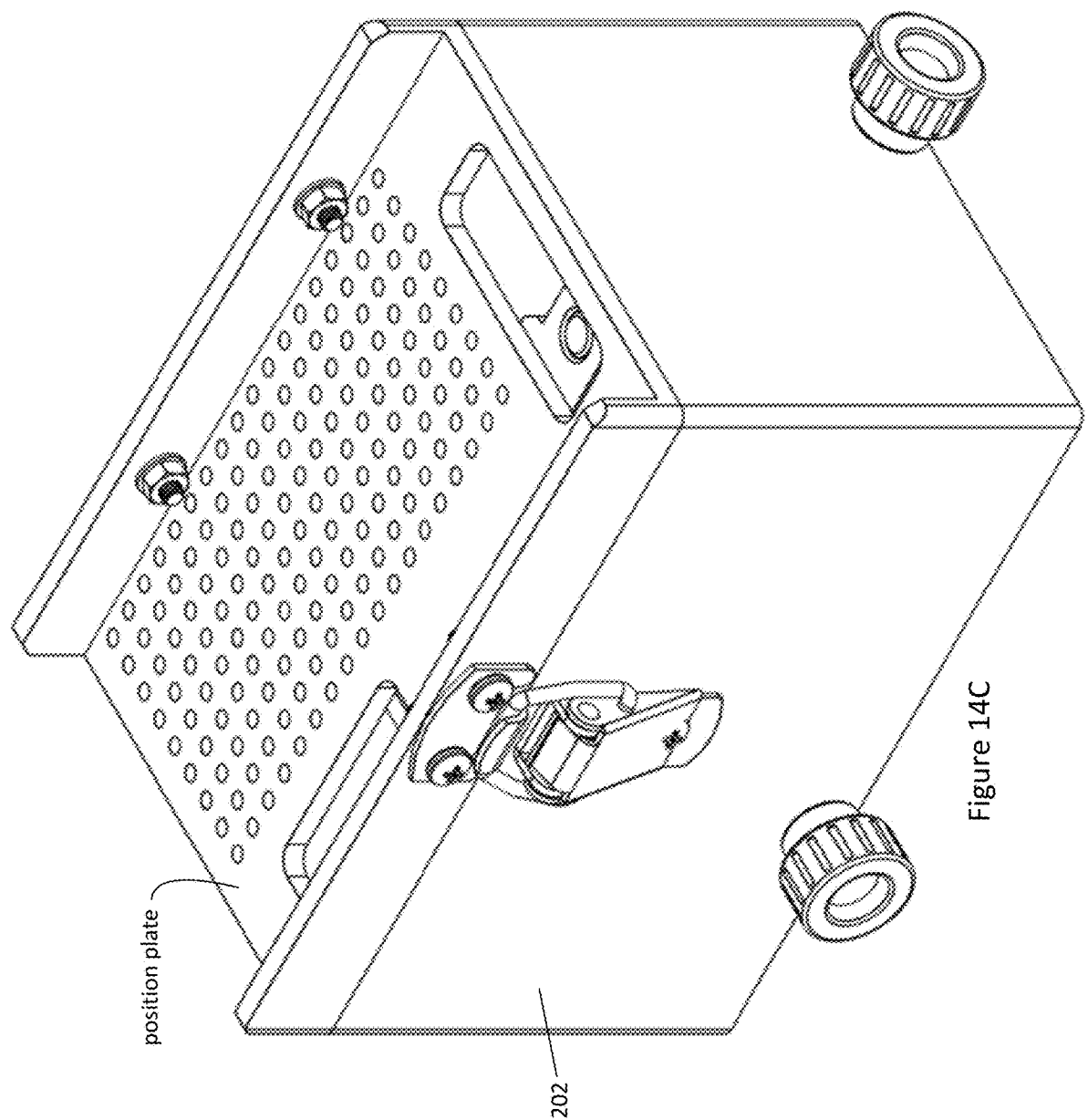
FIG. 14C illustrates an embodiment of the electromechanical fob key actuator mechanism with the cover position plate enclosing the cradle.

FIG. 14C shows the box in the closed position. The lid can act as a positioning plate and be provided with a matrix of holes for mounting an actuator 301 as illustrated in FIG. 14D. The motor 301 can be attached by screws to the positioning plate at a position corresponding to a button on the fob. The actuator 301 can be of the feed screw type that travels over 1 cm in length, so that a variety of thicknesses of fobs can be accommodated. The tip of the actuator shaft can include a load sensor so that the actuator can sense when contact with the button is achieved. It will be understood that the selectable positioning of the actuator 301 on the positioning plate can take a variety of forms, for example repositionable adhesive, magnets, etc. While not illustrated in FIGS. 14B and 14B, the shielding or fob jamming transmitter 302, lock 120, battery or power connection and other electronics can be included within the unit 202.

In some embodiments, the KIB device 202 connects to a server, which may be the same as server 204 or a different server, to receive the positioning of actuators within the KIB 202 to be able to be self-aligned by way of a database of key fobs.

In some embodiments, the server 204 has a database containing information on the different key fobs for different models and makes of vehicles and the user may receive all the settings by entering the make and model of the car.

In another embodiment, a user may take a photo of the fob and send the photo to the server 204 and the server recognizes the type of the key fob 104 to be used by the electromechanical actuator mechanism 210.

In an alternative embodiment, a user may take a photo and the app 206 may use an image recognition method known in the art to recognize the different keys on the key 104 and implement the position of the key when using the electro mechanical actuating mechanism 210. Alternatively, the image recognition may be done on the server 204.

In some embodiments, the positioning of the actuator 311 within the KIB device 202 may be done remotely through app 206. In one example, the user can navigate the actuator 311 using the app and a camera of the user's cellphone and define the position of each key for the actuator mechanism 210.

In some embodiments, the app 206 may predict the next command so that the actuator 311 can be positioned over the most probable button on the key fob 104 before the command is received from the app 206.

Figure 15:
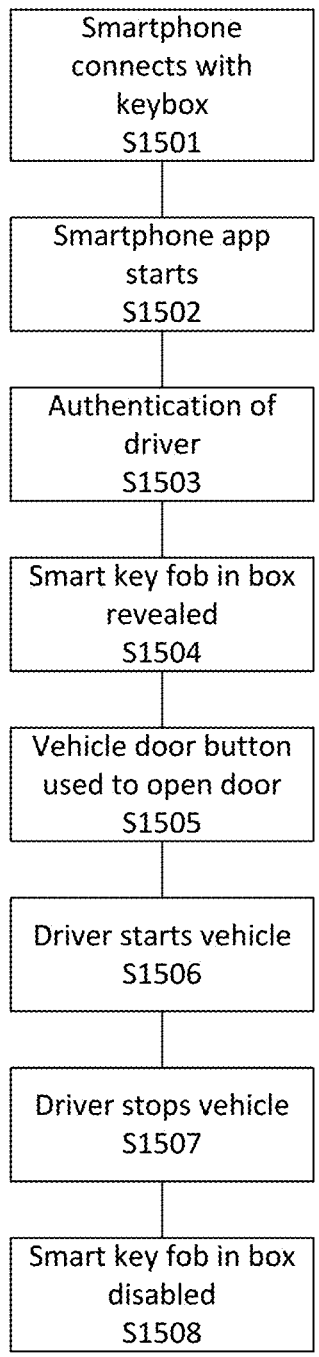
FIG. 15 is a flow diagram of a first embodiment of the steps involved in using a vehicle with a KIB device.

As illustrated in FIG. 15, steps S1501 to S1508 are the steps involved in using the vehicle 201 with the KIB device 202 in accordance with an embodiment of the present disclosure. According to S1501 the smartphone of the user connects to the KIB device 202. Then the app 206 starts and authenticates the driver using the user key as previously explained in this application. After authentication, the KIB device 202 reveals the key fob 104 stored in the key box 208. The user then can use the vehicle key buttons to open the vehicle door. The driver then can start the vehicle and use it as in step S1506. Upon stopping the vehicle, as in step S1508, the user may lock the door and the KIB device disables the key fob. Again, the disabling may be achieved by different techniques.

Figure 16:
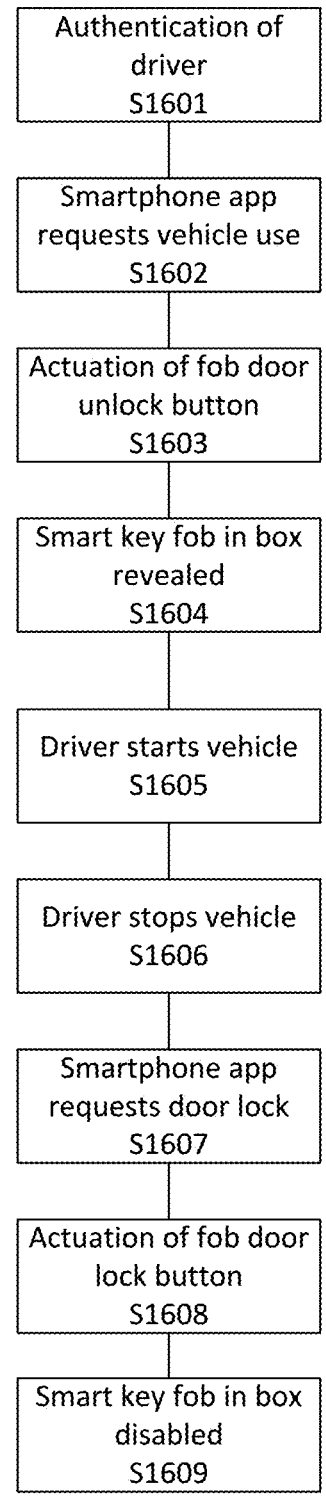
FIG. 16 is a flow diagram of a second embodiment of the steps involved in using a vehicle with a KIB device using actuation of smart key fob buttons to unlock and to lock the vehicle doors.

Turning now to FIG. 16, it illustrates different steps, S1601 to S1609, for a driver requesting the use of the vehicle via the application 206. The KIB device authenticates the driver and the smartphone application 206 requests the use of vehicle 201. In S1603 the KIB device actuates the fob 104 open door button (e.g., either 239 or 239' depending on the setting) to open the vehicle door. Then the KIB device 202 reveals the key fob 104 to allow the driver to start and use the vehicle. Upon stopping the vehicle, the driver uses the application 206 to close the doors as in S1607. The KIB device 202 then actuates the lock button of the key fob 104 (e.g., either 239 or 239' depending on the setting) to lock the doors and disables the key fob 104 using the fob jamming transmitter 302, according to one embodiment.

FIG. 17 illustrates the steps involved, S1700 to S1709, in using the KIB system in another embodiment of the present disclosure. After authenticating the driver, the driver pushes the vehicle door button causing the vehicle to send an LF challenge to the smart key fob 1701. The KIB device 202 uses the low-frequency receiver and re-transmitter to receive the LF challenge sent by the vehicle and retransmit it to the fob 104 embedded in the KIB device 202. The fob 104 then responds to the challenge and unlocks the door accordingly. The driver then can start the vehicle use it. Upon stopping the vehicle, the driver again pushes the door button to lock the door which causes the vehicle to send out another LF challenge which is received and retransmitted to the embedded key fob 104 which responds accordingly to lock the door as in step S1707 and S1708. Finally, the KIB device disables the fob 104.

FIG. 18 illustrates the steps involved, S1800 to S1809, in using the KIB system in yet another embodiment of the present disclosure. After authenticating the driver, the driver pushes the vehicle door button causing the vehicle to send an LF challenge to the smart key fob 104. The KIB device 202 uses the low-frequency receiver to detect the LF challenge sent. This LF challenge could be detected close to each on the doors or the trunk. As a result of this detection, the KIB device then actuates the fob buttons (e.g., either 239 or 239' depending on the setting) to open the door of the vehicle. The driver then can start the vehicle use it. Upon stopping the vehicle, the driver again pushes the door button to lock the door which causes the vehicle to send out another LF challenge which is received by the receiver, as in step S1807. In response to this detection, in step S1808, the KIB device actuates the fob (e.g., either 239 or 239' depending on the setting) which responds accordingly to lock the vehicle doors. Finally, the KIB device disables the fob 104.

Referring now to FIG. 19, it illustrates the steps involved, S1900 to S1907, in using the KIB system in an embodiment wherein the smartphone uses a background application to connect to the KIB device or key box according to steps S1900 to S1906. In this method, the background application connects to the KIB device. Then the KIB may detect whether the smartphone is close to the vehicle before the background app authenticates the driver with the KIB device and allows the driver to open and/or use the vehicle. If there is a need, the background app can launch a foreground application as in steps S1904 and S1905 which can be used by the driver to authenticate and use the vehicle. An example of such a need for using a foreground application is when a condition is attached to the driver's use of the vehicle such as accepting a schedule setting or use of a Breathalyzer to check for sobriety before driving the vehicle. If there is no condition for the drivers driving the background application would be sufficient to allow the driver to use the vehicle.

There are different ways for the background app to launch the foreground app. In a general-purpose computer, the operating system can typically grant permission to a background process to launch a foreground process. In the case of the Apple iOS, restrictions are imposed on this ability, so the background process can present a screen message and/or an audio prompt informing the user to call up the foreground app. The use of wireless keyboard commands can also be used to call up a foreground app as is disclosed in Applicant's PCT patent application publication WO2017/177311 published on 19 Oct. 2017.

In another embodiment, as shown in steps S2000 to S2006 of FIG. 20, is the process used to determine whether the smartphone is inside the vehicle or outside the vehicle using the wireless ID of the smartphone. The background application authenticates the driver with the KIB device and receives the smartphone wireless ID. The KIB device then detects the Received Signal Strength Indicator (RSSI) from the smartphone and determines if the driver is inside or outside the vehicle. Then the receiver detects the LF challenge message of the car and only retransmit it to the embedded fob 104 if the smartphone is located outside the car. The embedded fob then responds with the result that controller 106 causes opening the doors of the vehicle.

In an alternative embodiment, instead of detecting the car signal challenge and retransmitting to the key fob, the KIB device may connect directly to the car bus to detect activation of the door-key button or door handle sensor.

In some embodiments, if the KIB device may detect more than one authorized user and the KIB system may have to activate the foreground application to determine which authorized user would be the driver. A good example is a family with multiple authorized members who travel together. In such cases, the foreground app is automatically launched to determine which authorized user will be the driver.

Figure 21:
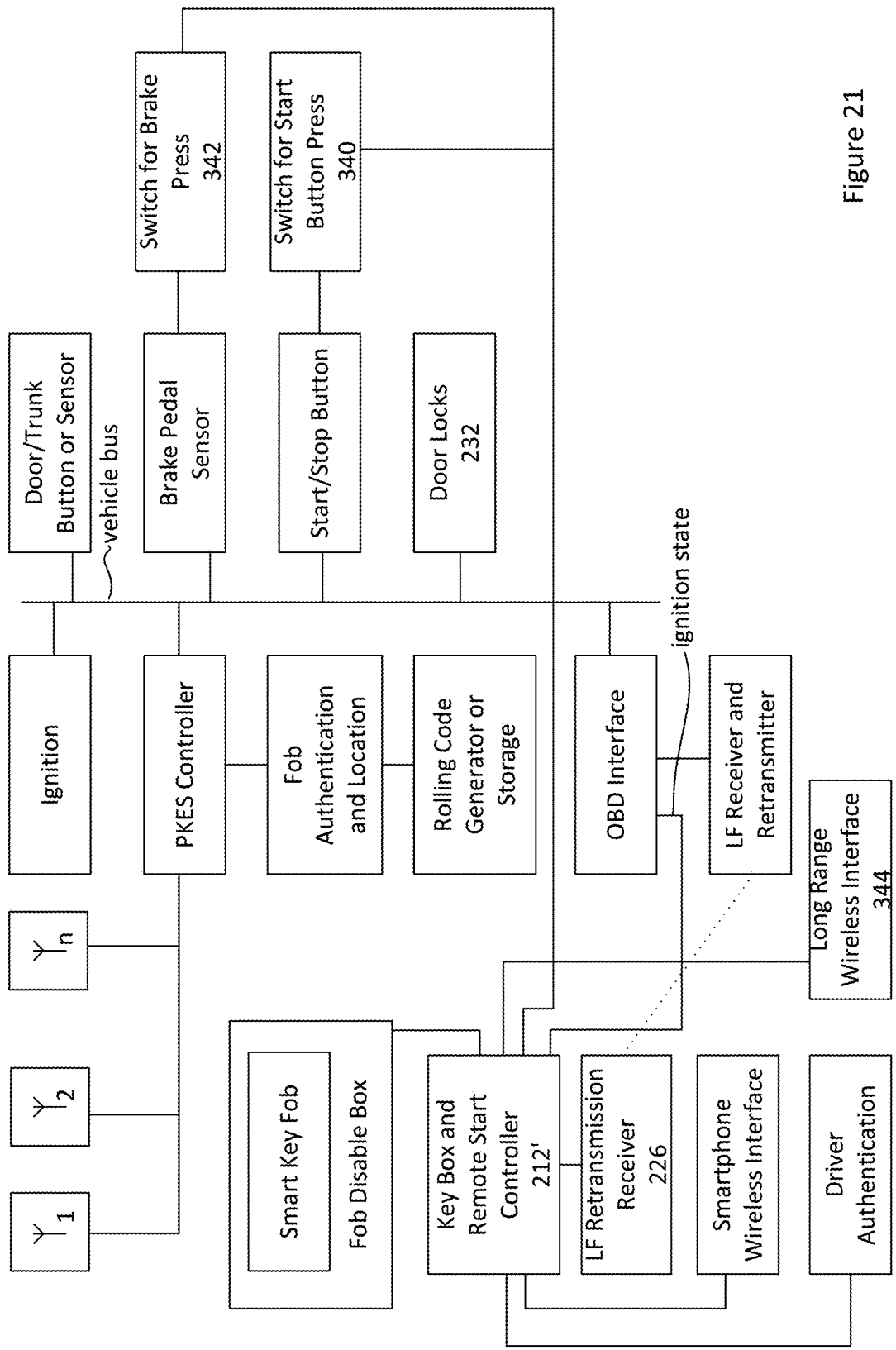
FIG. 21 is a schematic block diagram of a key-in-box (KIB) device associated with a PKES system in which the KIB device includes remote vehicle starter capabilities.

In FIG. 21, the KIB system 200 further has a remote starter controller module which may be embedded in the controller 212' (as shown in the drawings) or maybe an independent module. The KIB device may have ports for connecting it to a switch for start button press 340 and the switch for brake press 342 so that the remote starter controller module controls them to start the vehicle remotely. It further may have a connection wired or wireless connection between the controller 212' and the OBD interface 225 so the controller 212' receives the ignition status of the vehicle. The KIB device may also have a long-range wireless interface 344 connected to the controller which enables a user to activate the remote starter using the internet or other long-range connection means.

In some embodiments, the app 206 may be programmed to lock, unlock and then re-lock doors when the vehicle is being remotely started. This is due to the fact that KIB system 200 does not know if the OEM security and doors are locked when the start command is received by the switch for start button 3400.

In some embodiments, when the start command is received by KIB device 202, the actuator 210 pushes the lock button of the fob lock 104, subsequently it pushes the unlock button to disarm the OEM security 100. Then the KIB system 200 engages the switch for brake press 342 followed by the switch for the start button 340 to start the engine. Upon detecting that the engine is running, the actuator 210 pushes the lock button of the fob 104 to re-lock doors and rearm the OEM security system 100.

In some embodiments, the vehicle may require seeing the key fob 104 to properly shut down the vehicle. Therefore, when the system 200 remote starts the vehicle and confirms that the engine is running, the system may hide the fob key 104 from the vehicle.

In one embodiment, the system 200 may shut down the vehicle due to unauthorized use or when the system is timed out by lack of use, for example after 15 or 20 minutes. In such scenarios, the system 200 first verifies that the engine is running then again allows the vehicle to detect the key fob 104 and engages the OEM start button 340 to shut down the vehicle.

In some examples, when the vehicle has been remotely started and the system detects the OEM brake 342 without an authorized smartphone and the app 206 being detected, it first verifies that the engine is running, then allows the fob 104 to be detected by the vehicle; subsequently it engages the OEM start button 340 shutting down the vehicle.

In one embodiment, a mobile phone SIM card may be used in a mobile telephone transceiver to provide the long-range wireless interface 344 with the data connection.

In some embodiments, the application 206 may have features for controlling the remote car starter. In one embodiment, the KIB device 202 has the remote starter capabilities but does not have all the connections necessary to work as a remote car starter. This KIB system would have inactive modules in the system or pop-up alerts to advise the user of the possibility of adding such features upon the installation of relevant hardware.

Figure 22:
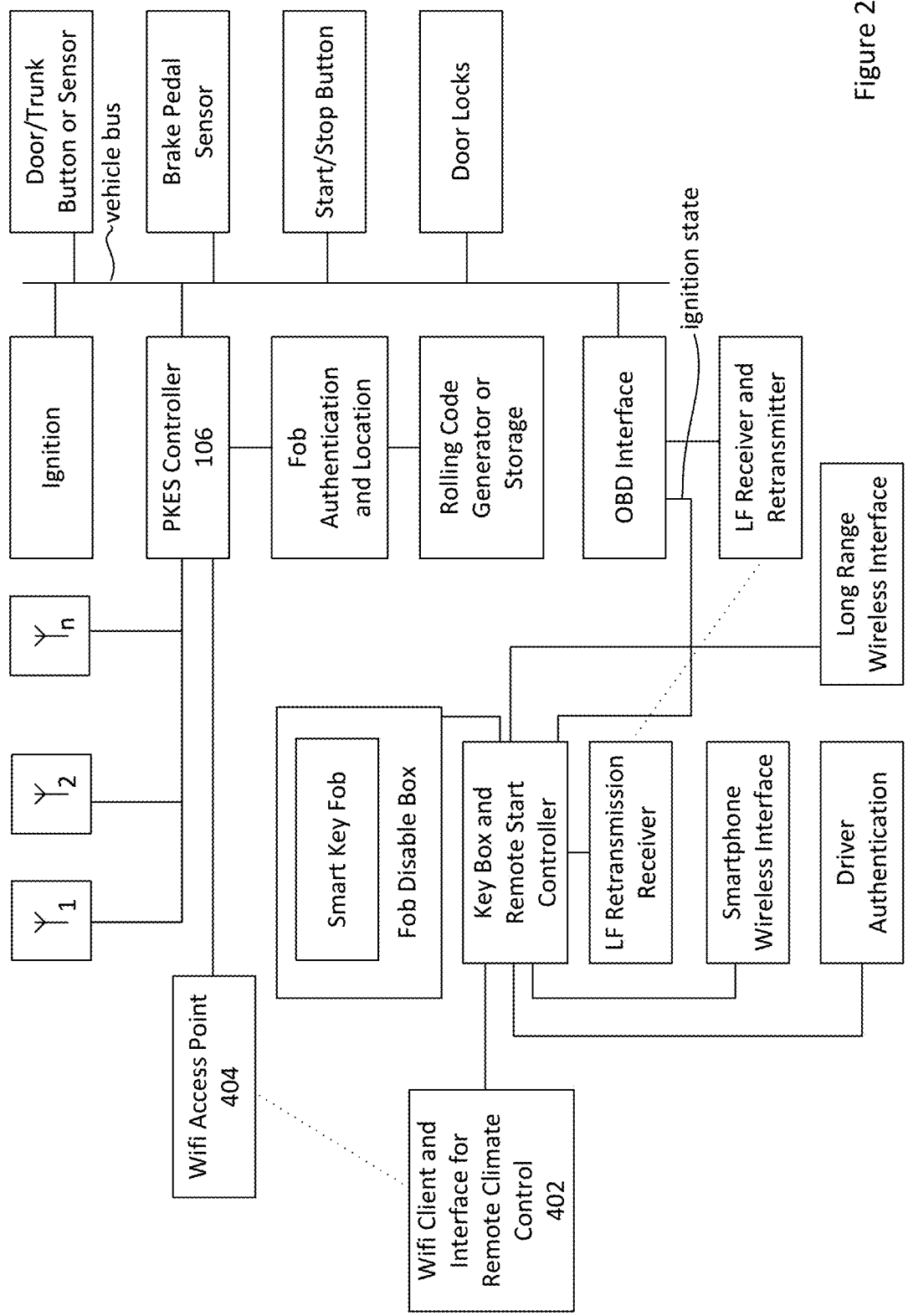
FIG. 22 is a schematic block diagram of a key-in-box (KIB) device associated with a PKES system in which the KIB device includes a remote vehicle warmer using a Wi-Fi connection.

FIG. 22 shows an embodiment of the KIB device having a Wi-Fi client and interface for remote climate control 402. This Wi-Fi client 402 connects to a Wi-Fi access point 404 of the vehicle which is connected to the PKES controller 106. This connection would allow the application 206 to activate the heating of the car which is very desirable especially for electric cars ("EV"). This would allow a user to use the KIB system to activate the heating or cooling of the vehicle in advance, especially when the EV is plugged in and does not use the battery for such purposes.

In some embodiments, the system 200 may have a radio-frequency identification ("RFID") which may be a near-field communication (NFC) reader. The RFID/NFC reader may be placed in a location in the vehicle, most likely, but not limited to, the bottom corner of the wind shield to be conveniently accessed by the vehicle user. The reader may allow access to the vehicle via an RFID/NFC card, tag or other NFC device. The reader may authenticate the NFC device, then depending on the criteria, unlock or lock the doors and allow a time window to start the vehicle. The method for locking/unlocking and starting the vehicle remains the same as what was used when the app 104 is used.

This authentication method can be used either in conjunction with the smartphone app 206 or as an independent authentication system or node to the system.

Figure 23:
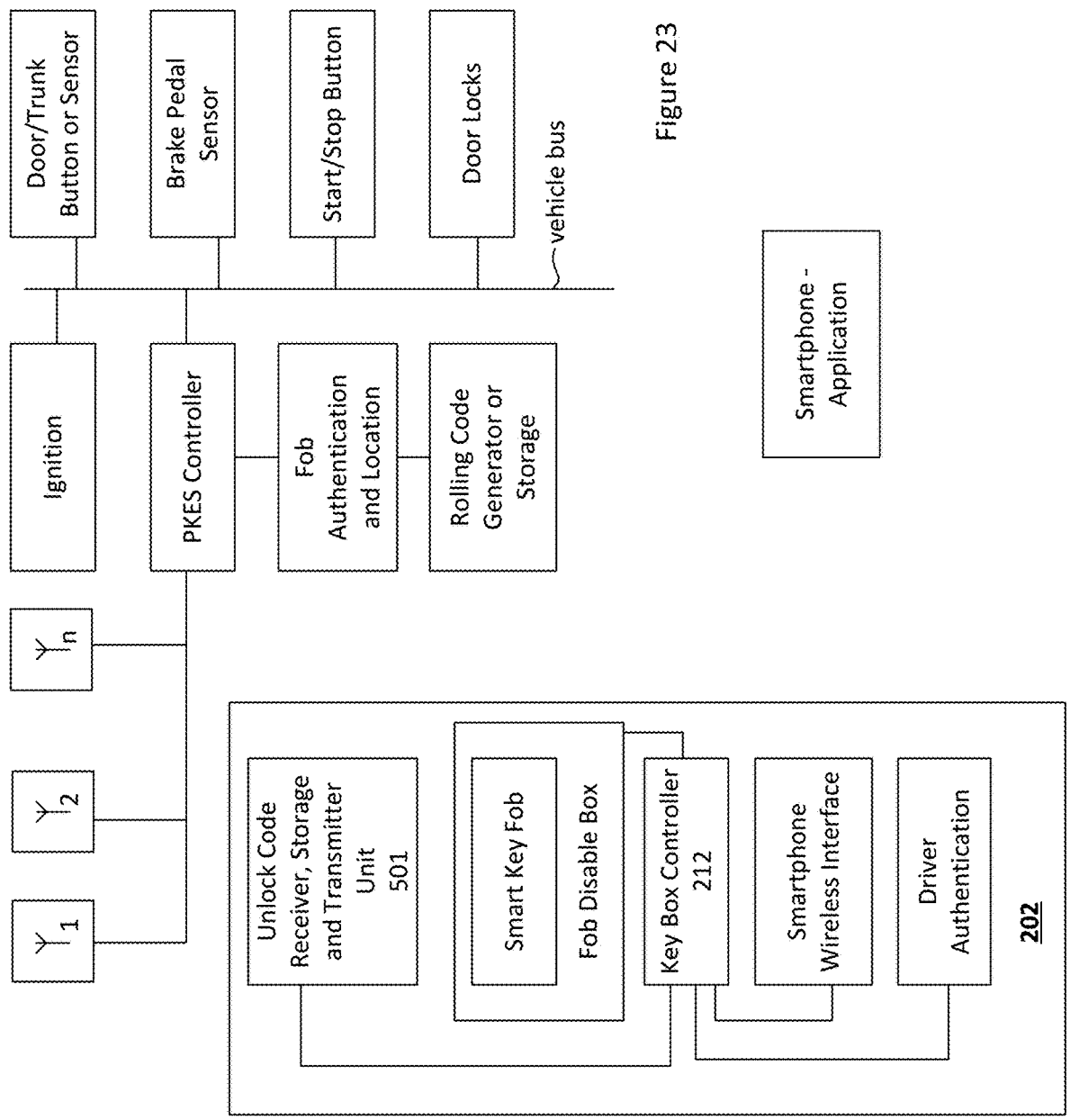
FIG. 23 is a schematic block diagram of a key-in-box (KIB) device associated with a PKES system in which the KIB device includes an unlock code receiver, storage and transmitter unit in accordance with one embodiment of the present disclosure.

FIG. 23 illustrates a key-in-box (KIB) device associated with a PKES system in which the KIB device includes an unlock code receiver, storage and transmitter unit. As described herein, the PKES Controller system of a vehicle generally function on a rolling code. Once a smart key fob is paired with the vehicle (i.e. the code sent by a key matches the code of the vehicle, such that the doors may be unlocked), both the smart key fob and the vehicle may cycle through the same numbers after each unlock command. For example, after each unlock command, both the key and the vehicle may incrementally add a preprogrammed variable to their unlock code.

Someone skilled in the art will appreciate that the vehicle stores the unlock code of the last activation of unlocking for each smart key fob separately. This enables each smart key fob owner to operate the door unlocking regardless of whether they were the last user of the vehicle. Additionally, while described for the unlocking of doors, the smart key fob and vehicle generally have similar functionalities for door locking, opening of the trunk door, etc.

In the embodiment of FIG. 23, the vehicle may be unlocked by a driver authenticated by the smartphone application, as described herein, by transmitting a command to an unlock code receiver, storage and transmitter unit 501. For example, the key box controller 212 may be in communication with the unlock code receiver, storage and transmitter unit 501, such that it may transmit a command to proceed with the unlocking of the vehicle upon receiving the request from the driver using the smartphone app. The unlock code receiver, storage and transmitter unit 501 is thus operable to receive the unlock command, retrieve the current unlock code (e.g. the code following the one used in the previous unlock) from its memory storage and transmit the retrieved code to the vehicle. Upon transmission of the current unlock code, the doors of the vehicle may unlock.

The unlock code receiver, storage and transmitter unit 501 may further be operable to try a number of subsequent unlock codes stored in its memory storage, such that it may find the matching code at which the vehicle is currently at.

In some embodiments, for FIG. 23 but also for the previous figures, the smart key fob 104 may be provided by an integrated circuit or chip designed to be programmed as a smart key fob duplicate or a new smart key fob for the PKES system. The chip will be registered with the vehicle as an additional key, thereby allowing the chip to lock/unlock doors, start ignition, or perform other functions that a smart key might perform.

The chip may function as a smart key fob and communicate directly with the vehicle. The chip may have additional functionality, such as being able to communicate to the vehicle the location of the request for locking/unlocking, ignition, or other functions. For example, the chip may receive a request from a user's smartphone to unlock the doors. The chip may receive the location of the smartphone during the request. The chip may make a determination of whether the smartphone's location is close enough to unlock the doors or may simply pass on the request and location to the vehicle which may perform its own determination of whether the smartphone is close enough.

The chip would allow for the system, as described in the previous figures, to be put in place without sacrificing an OEB key fob provided to a vehicle owner from the vehicle manufacturer or dealer. It would also allow for greater protection from the risk of theft, as the theft of the chip or KIB device with a chip would not lead to the theft of an OEB key fob of the vehicle which could unlock the vehicle on its own.

The KIB device with a chip may include additional anti-theft properties as well. If the chip, or any other part of the KIB device such as a Key Box Controller, detects non-authorized attempts to access the KIB device, it may alert a system administrator of the attempts, as well as transmit information about the attempts (time, location, etc.) and proceed to erase the chip's access to the vehicle to prevent any future non-authorized attempts. Furthermore, the chip can be arranged to erase its memory when tampered with or it can be physically secured (e.g. epoxied) to prevent access to its memory contents.

The activity or functions of the chip may be selectively or completely disabled or activated by a number of ways. This may be achieved by different techniques such as controllably supplying power to the chip, using a box completely shielding any transmission from the chip, or using a signal-jamming transmitter. The chip may be fixed in a position within the KIB device so that a mechanical actuator or electromechanical fob key actuator mechanism can be used to push buttons on the chip remotely. A molded holder for the chip or a crushable foam material can be used to hold the chip in position within the box. The casing of the chip may be opened to expose the chip circuit board and allow for a probe card to match the circuitry and control the power or buttons. If the chip comes equipped with a data terminal interface, the KIB device may selectively activate or disable the chip by communicating with the data terminal interface, activating functions within the chip that can cause the chip to lock or unlock doors, or start the vehicle, etc.

Figure 11B:
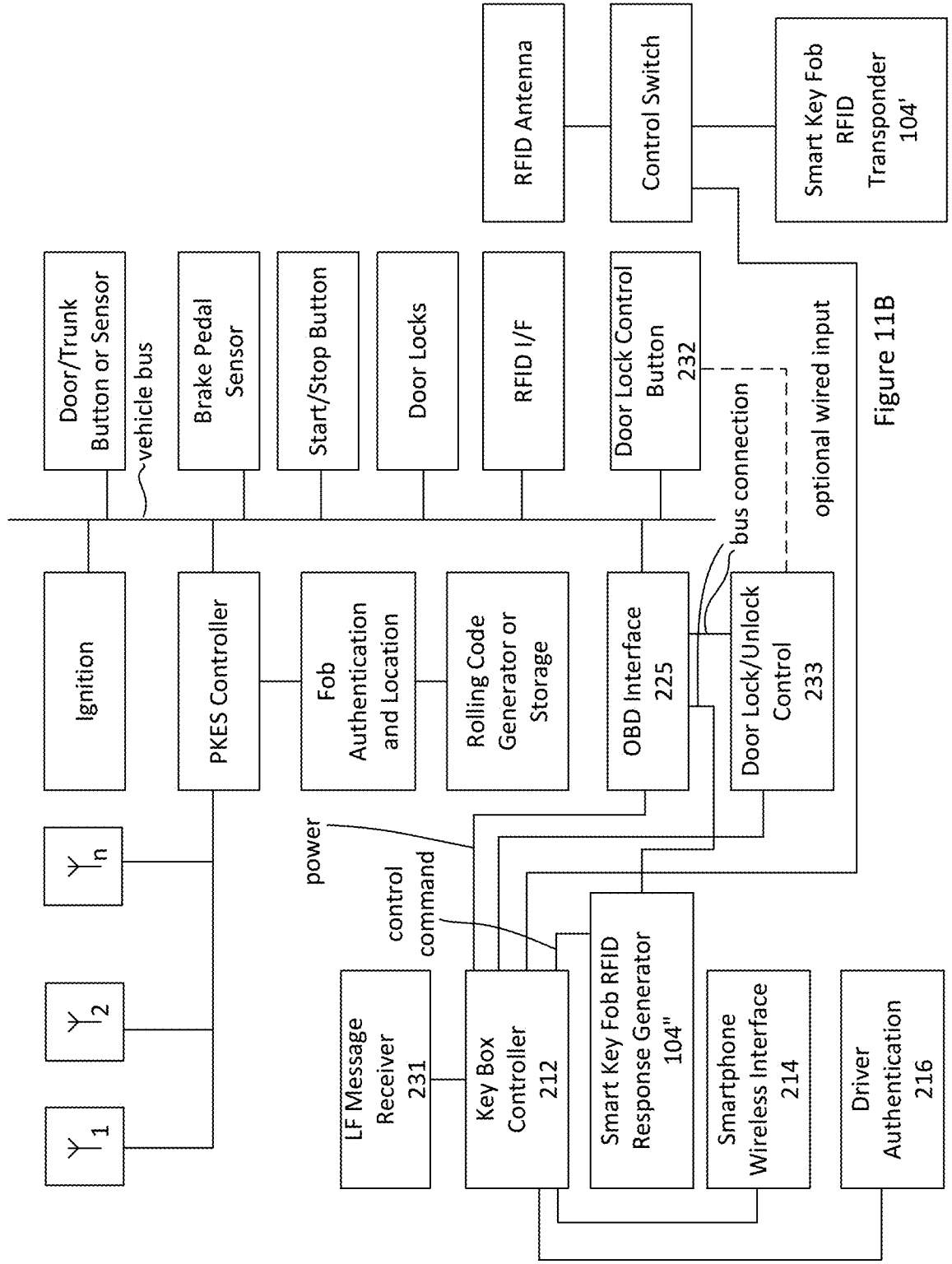
FIG. 11B is a schematic block diagram of a key-in-box (KIB) device associated with a PKES system in which the KIB device can communicate with the vehicle bus interface and/or the physical switches in the vehicle to unlock or lock the doors in accordance with an embodiment of the present disclosure in which the RFID transponder component of the key fob is used to control use of the vehicle.

As illustrated in FIG. 11B, it will be understood that PKES systems may include an RFID interface for interacting with a transponder embedded in the key fob. Such a transponder will operate even when the key fob battery fails because it is powered by the vehicle's RFID interface. In some vehicles, a slot may be provided on the vehicle console for receiving the key fob in proximity to the RFID interface. When a driver's key fob has no battery power, a mechanical key can be used to open the car door and enter the vehicle. When pressing the start button, the PKES system can cause the RFID interface to send a power signal that, within a close range, can power the key fob transponder circuit. The key fob transponder will then be operative to exchange cryptographic messages with the PKES system that allows the PKES system to authenticate the key fob and start the vehicle if the authentication is successful. This is well known in the art.

For vehicles that are equipped with such an RFID interface, the key-in-box system can comprise a compatible transponder 104' as the key fob without including the remaining components for the remaining functions of an OEM key fob or key fob chip, such as an RF transceiver and door control signal generator. In such embodiments, door control can be done by connecting to the vehicle bus at interface 225 or by directly connecting to door lock/unlock actuators. A transponder that is compatible with the PKES can be an OEM key fob with its battery removed (and not connected to power by the KIB device) or it can be a separate transponder programmed with the requisite cryptographic data. In either case, the transponder is controlled to only be "seen" by the PKES system when the driver is authorized by the KIB device. When an OEB fob with the battery removed is used, jamming or controlled shielding can be used to enable/disable the transponder (not shown in FIG. 11B). When a separate transponder circuit is used, similar jamming or controlled shielding can be used to enable/disable the transponder (not shown in FIG. 11B), however, it may be preferred to provide a control switch between the transponder circuitry 104' and its antenna as shown in FIG. 11B as a way to effectively enable/disable the transponder.

In the case that a separate transponder is provided, it may be possible to use an OEM key fob of a vehicle to determine the requisite cryptographic data for storing in the separate transponder. For example, at the time of installation of the KIB device, a reader may be used to power the OEB key fob's transponder and to provide challenges such that by analyzing responses, the type of transponder algorithm can be determined. Once the type of smart key is determined by the system, a "clone" of the key fob can be created. This may or may not contain the required security information contained within the OEM fob which is already programmed to the vehicle.

When the RFID interface data is accessible on a vehicle data bus, as illustrated in FIG. 11B, it is possible to selectively connect a transponder or a transponder emulator 104" directly to the bus in a manner that does not rely on RFID coupling to power the transponder. In this case, the transponder 104' and its control switch can be redundant, just as the key fob RFID response generator 104" is not required when transponder 104' is used. The requisite cryptographic data can then be written to a microcontroller unit (MCU)/module. The MCU may or may not contain existing RFID MCU technology. The MCU/module may be a separate device or contained within another device (i.e. a remote starter).

Once the simulated smart key algorithm has been loaded to the MCU, the MCU can be connected to the vehicle's LF control module via a hard-wired connection. This is most commonly done by connecting the transmit/receive transponder antenna line, commonly known as the "low power transponder", however an LF data line may exist and be utilized by some vehicles. This connection can be made using, for example, a T-Style connection or by a direct wire connection to the vehicle's system. If the simulated fob transponder/transponder is a "full clone" of the OEM key and the unique or secret ID's were cloned, then a learning process is not required. If the simulated fob/transponder is not a "full clone" and still requires programming to the vehicle, then a programming process can be performed. This process varies depending on the vehicle year, make and model.

The simulated fob/transponder 104" can be activated/enabled using a control signal or command (typically in software) from the key box controller 212 by various authentication mechanisms of the system. This can be a remote key fob, telematics device, etc. Once the fob/transponder is activated, it can read message challenges sent to the OEM key on the LF control system via, for example, the immobilizer data line of the vehicle bus. Responses to these messages may be sent back on the same data line, thus mimicking the data response from an OEM key responding to this same challenge via wireless field generation. When the vehicle has received a valid response to the message challenge it can allow starting and driving of the vehicle in the same manner as if the OEM responded to these messaged.

As in other embodiments, the LF message receiver 231 can be used in the embodiments of FIG. 11B to detect when the door handle contact causes the PKES to send a signal to the key fob to determine its presence for door unlocking and locking controls. The KIB device can use the signal from receiver 231 to as a trigger for the operation of control 233.

Figures 24, 25:
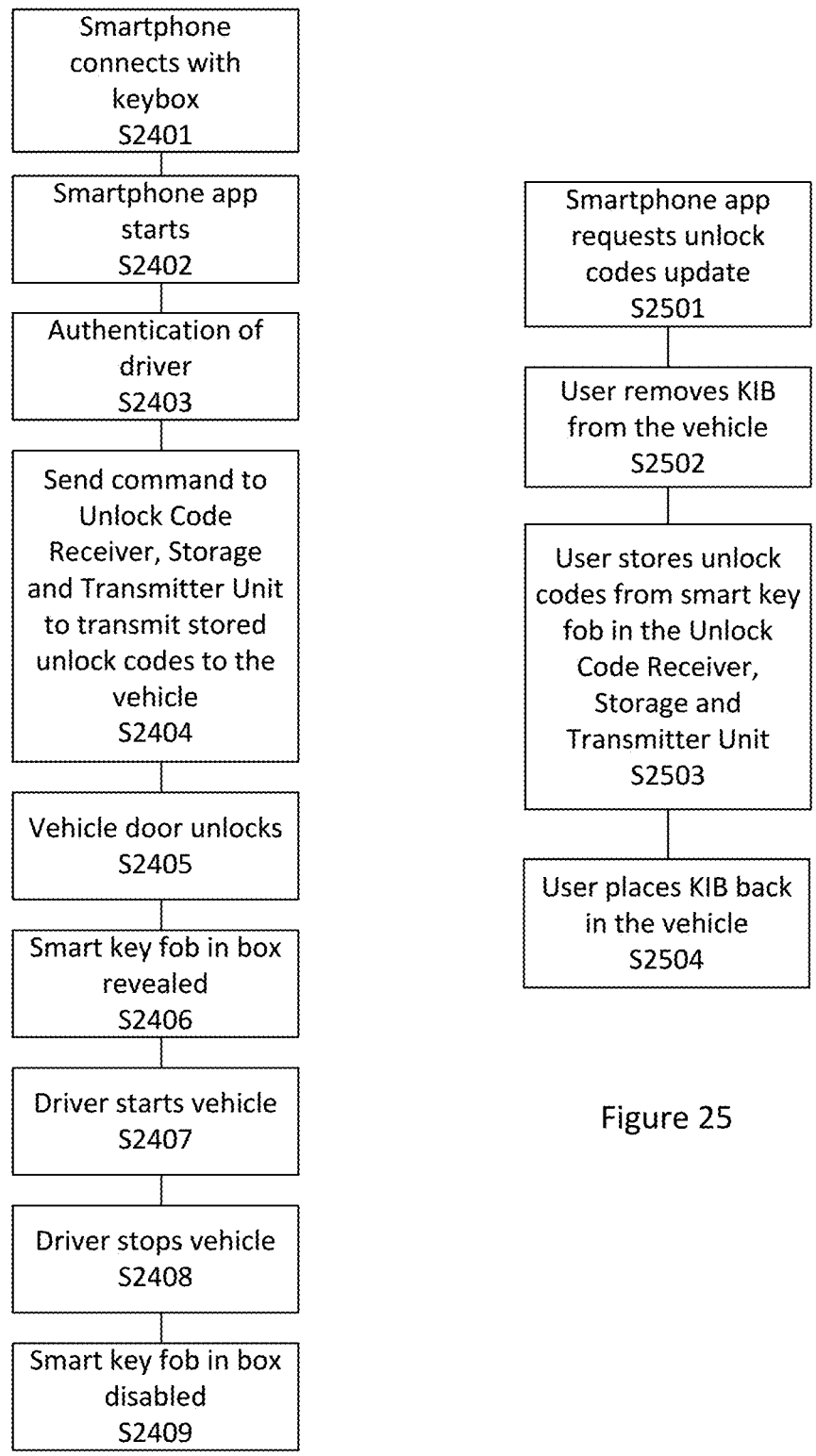
FIG. 24 is a flow diagram of exemplary steps involved in using a vehicle with a KIB device equipped with an unlock code receiver, storage and transmitter unit.
FIG. 25 is a flow diagram of exemplary steps for storing new unlock codes on an unlock code receiver, storage and transmitter unit.

Now referring to FIG. 24 which is a flow diagram of exemplary steps involved in using a vehicle with a KIB device equipped with an unlock code receiver, storage and transmitter unit. Similar to the operation of other KIB implementations as described herein, the smartphone may first connect with the keybox at step S2401. The smartphone app may further be started (S2402) by a driver wishing to access the vehicle. With the smartphone app initialized, the driver may be authenticated at step S2403. Once duly authenticated as a driver having access to the vehicle, a command may be sent to the unlock code receiver, storage and transmitter unit, such that it may transmit the stored unlock code at which the vehicle is currently at (S2404). If the transmitted unlock code matches the vehicle's PKES Controller one, the vehicle door unlocks (S2405). The remaining steps may be the same as other embodiments described herein, such that the smart key fob may be revealed (S2406) and the driver may start the car (S2407) to complete the desired journey. Once completed, the driver may stop the vehicle (S2408) which may trigger the disabling of the smart key fob in the box (S2409).

FIG. 25 is a flow diagram of exemplary steps for storing new unlock codes on an unlock code receiver, storage and transmitter unit. As the unlock code receiver, storage and transmitter unit does not have the number generator of the smart key fob, and that it may not be possible to retrieve the function used as the number generator, it may be required to store a number of unlock codes in the unlock code receiver, storage and transmitter unit. For example, when the smart key fob is taken outside the range of the vehicle, the pressing of the unlock key will not trigger a cycling of the vehicle's unlock code in the PKES system (i.e. the vehicle's code will stay at the value of the last door unlocking). Alternatively, a transmitter can be used to jam the ability of the vehicle to read the codes transmitted by the fob while the fob codes are being read by the receiver 501. This has the advantage of greatly reducing the distance between the car and location of recording codes.

While storing and actuation of codes can be used as an alternative to an automated actuator, as for example is illustrated in FIGS. 12 to 14, it involves periodic learning of codes through manual programming or the like. It will be appreciated that an automated actuator can be used to cause the fob to transmit codes for capture and storage within the KIB device, so that the stored code can then be used to control the vehicle. This allows the enjoyment of the benefit of automation and a reserve of codes in memory that can be used in the case of failure of the automated actuator, for example a mechanical failure in the electromechanical actuator or loss of contact between a probe pin and the circuit board of the fob 104' due to extreme mechanical vibration (or any other source of failure). When the automated actuator fails to transmit new codes, the KIB system can notify the user that service of the KIB device will be required to effect repair of the actuator, for example.

As such, the smart key fob may be used away from the vehicle while the unlock code receiver, storage and transmitter unit is in recording mode. The unlock code receiver, storage and transmitter unit may thereafter store in memory all the codes sent by the smart key fob. Thus, a user may store any number of codes in the unit by pressing a desired number of times on the unlock button on the smart key fob. For example, a user may store one hundred unlock codes in the unlock code receiver, storage and transmitter unit. Once placed back in the vehicle, the KIB may then be operable to send, when requested by a driver wishing to unlock the doors through the smartphone app, the newly stored codes. By storing a large number of unlock codes, the user may reduce the amount of times in which he needs to remove the KIB from the vehicle to store new unlock codes.

It will be appreciated that the sequence of codes used by the fob can be common to different functions. In this case, to store multi-function codes such as unlock, lock and trunk, the sequence of codes to be stored can be: unlock, lock, trunk and then again: unlock, lock, trunk, and so on (the chosen sequence is not of importance and can be changed). In this way, if an unlock code is used following a lock code, the stored trunk command is skipped.

In FIG. 5, the first step for the update of the unlock codes may be the smartphone app requesting that new unlock codes be added to the unlock code receiver, storage and transmitter unit (S2501). It should be noted that a user may add new unlock codes before being requested by the smartphone app, and that the smartphone app may be operable to assess the number of remaining unlock codes stored in the unlock code receiver, storage and transmitter unit. The smartphone request for new codes may thus only be triggered once the number of unlock codes reaches a certain threshold, such that it never reaches zero (thus ensuring that a driver does not become stranded).

As described herein, the driver/user may then remove the KIB from the vehicle at step S2502 and stores new unlock codes by operating the smart key fob in proximity to the unlock code receiver, storage and transmitter unit while being outside the range of the vehicle (S2503). The unlock code receiver, storage and transmitter unit thus stores the unlock codes for each activation of the door unlock button pressed on the smart key fob. The user/driver may thereafter place the KIB back inside the vehicle (S2504), such that the system may be used afterwards. As the vehicle may have been locked/unlocked a number of times while the user/driver updated the unlock codes in the unlock code receiver, storage and transmitter unit, the unit may have to cycle through the first few newly registered codes before finding the one matching the current state of the vehicle's PKES.

In some embodiments, the KIB may communicate with a user device (such as a smartphone) to collect and store location information about the user device (such as GPS location). Such information may be used at a later time to compare to subsequent requests for unlocking the car or igniting the engine or any other requests. This feature allows for greater theft protection. By comparing the GPS location of the user device at the time of locking the door or parking the car to the GPS location of the user device at the time of unlocking the door or starting the car, and preventing the car from unlocking or starting when the GPS locations do not match, the KIB further protects against vehicle theft by preventing situations where thieves may amplify, relay or simulate the signal of the user device when the user device is, in fact, not close to the vehicle. There may be situations where the car is moved, such as by a ferry or when a car is towed, where the GPS location of the user is no longer an accurate measure of the proximity of the user to the vehicle (because the location when the car was locked is no longer the location of the car). In these situations, the user may perform an override function to bypass the need for location comparison, such as by accessing the smartphone application and informing the application that the user confirms that the unlock/ignition request is legitimate.

While described as the unlock codes, a person skilled in the art will appreciate that any other functionalities of the smart key fob may be similarly implemented.

What is claimed is:

1. A device for use with a vehicle having a passive keyless entry and start (PKES) system, said PKES system configured to send challenge messages to a key fob of the vehicle from internal and external antennas, to receive and process response messages from the key fob of the vehicle to authenticate the key fob and to determine if the key fob is inside or outside of the vehicle, the device comprising:

a wireless interface for local communication with a driver's device;

said key fob associated with said PKES system;

a key fob controller for controlling communications of said key fob; and a processor operatively connected to said wireless interface and to a non-transitory memory storing executable instructions causing:

(1) determination from a signal of said driver's device as measured by said wireless interface whether said driver's device is located inside or outside said vehicle;

(2) communication with said driver's device to determine if a driver associated with said driver's device is authorized to use said vehicle;

(3) control of said key fob controller to prevent said key fob from communicating with said PKES to prevent said driver from operating said vehicle when said driver is unauthorized to use said vehicle; and (4) when said driver is authorized to use said vehicle, (i) when said determination confirms that said driver's device is inside said vehicle, permit said key fob to receive said challenge messages sent by said PKES system and to permit said key fob to send said wireless response messages to said PKES system so that said key fob may be determined by said PKES to be inside said vehicle; and (ii) when said determination confirms that said driver's device is outside said vehicle, (a) permit said key fob to send said response messages to said PKES system and (b) use said key fob controller to control said challenge messages sent by said PKES system to said key fob so that said PKES system determines said key fob as being located outside the vehicle, even when said key fob remains located inside the vehicle.

2. The device as defined in claim 1, wherein said instructions cause said memory to store driver usage condition data in a configuration mode, and said executable instructions cause a driver associated with said driver's device to be authorized to use said vehicle only when conditions for said driver as defined by said driver usage condition data are met.

3. The device as defined in claim 1, further comprising a trigger signal receiver for receiving a trigger signal and being operatively connected to said processor, the trigger signal receiver comprising one of the group consisting of:

a challenge transmission receiver for detecting LF challenge transmission from PKES system, a transmitter module comprising a battery, switch and transmitter, said module being packageable and adherable to a door handle or on a door next to said handle, and a connection to wiring of the vehicle to a signal indicating actuation of a door button.

4. The device as defined in claim 3, wherein said key fob controller further comprises at least one electronic actuator for causing a door lock switch and a door unlock switch of said key fob in a housing for holding said key fob to be closed, wherein said processor is operatively connected to said wireless interface, to a trigger signal receiver and to said non-transitory memory storing executable instructions causing to respond to receipt of a trigger signal by said trigger signal receiver when said determination confirms that said driver's device is outside said vehicle as a door lock/unlock command by signaling said electronic actuator to close said door lock/unlock switch while causing said preventing said key fob from communicating with said PKES so that said PKES does not detect said key fob as being inside said vehicle.

5. The device as defined in claim 4, wherein said at least one electronic actuator comprises at least one probe card connectable to said processor having probe pins corresponding to traces or contacts of fob buttons on a circuit board of said key fob.

6. The device as defined in claim 4, wherein said instructions cause said processor to detect said door lock or said door unlock command by interpreting signals from said driver's device received over said wireless interface.

7. The device as defined in claim 1, wherein said determination whether said driver's device is located inside or outside said vehicle comprises determining from a signal strength of said driver's device as measured by said wireless interface whether said driver's device is located inside or outside said vehicle.

8. The device as defined in claim 7, further comprising a wireless relay separated from said wireless interface, said wireless relay for location in the vehicle and configured to measure said signal strength and to relay said signal strength to said wireless interface.

9. The device as defined in claim 1, further comprising an RFID reader module for mounting near a window of said vehicle and having a battery and a transmitter for transmitting to said wireless interface RFID data, said executable instructions causing said processor to determine if said driver is authorized to use said vehicle based on said RFID data, and if said driver is not authorized, to notify a system administrator of a non-authorized attempt and erase the lock/unlock code to prevent further non-authorized attempts to use the device.

10. The device as defined in claim 1, wherein the processor is further configured to collect and store location data of a user device during car locking or parking, collect and store location data of a user device upon a request to unlock or start the vehicle, compare the two locations, and only allow the unlocking or starting the vehicle operation if the two locations are significantly the same.

11. A method for sharing a vehicle having a passive keyless entry and start (PKES) system, said PKES system configured to send challenge messages to a key fob of the vehicle from internal and external antennas, to receive and process response messages from the key fob of the vehicle to authenticate the key fob and to determine if the key fob is inside or outside of the vehicle, the method comprising:

providing said key fob associated with said PKES system;

limiting communication of said key fob with said PKES system;

authenticating a user by wireless communication with said driver's device;

determining from a signal of said driver's device as measured by said wireless interface whether said driver's device is located inside or outside said vehicle;

when said driver's device is determined to be inside said vehicle, allowing said key fob to receive said challenge messages sent by said PKES system and to permit said key fob to send said response messages to said PKES system so that said PKES system detects said key fob inside the vehicle to allow said authenticated user to operate said vehicle; and when said determination confirms that said driver's device is outside said vehicle (a) permit said key fob to send said response messages to said PKES system and (b) use said key fob controller to control said challenge messages sent by said PKES system to said key fob so that said PKES system determines said key fob as being located outside the vehicle, even when said key fob remains located inside the vehicle.

12. The method as defined in claim 11, wherein said determining comprises determining from a signal strength of said driver's device whether said driver's device is located inside or outside said vehicle.

13. The method as defined in claim 11, further comprising:
receiving from said driver's device control commands of said authenticated user;
relaying said control commands to said wireless interface to create corresponding commands for said vehicle.

14. The method as defined in claim 11, wherein said limiting communication of said key fob with said PKES system comprises any one of the group consisting of:
jamming any communication with said key fob;
disconnecting power supply to said key fob; and
forming a Faraday cage around said key fob.

15. The method as defined in claim 11, wherein, in response to said trigger signal and to said determining when said driver's device is outside said vehicle, controlling door lock function of said vehicle to allow said authenticated user to lock said vehicle when use of said vehicle is terminated in accordance with said determining.

16. The device as defined in claim 1, wherein said key fob comprises an integrated circuit or chip designed to be programmed as a smart key fob duplicate or a new smart key fob for the PKES system.

17. The device as defined in claim 1, wherein said key fob controller comprises a repeater module located on a door of said vehicle and for repeating or amplifying said challenge messages from the PKES system to the key fob.

18. The device as defined in claim 1, further comprising a trigger signal receiver for receiving a trigger signal, wherein said processor is further operatively connected to said trigger signal receiver, and wherein said use of said key fob controller to control said challenge messages sent by said PKES system is done in response a receiving of said trigger signal by said trigger signal receiver.

19. The device as defined in claim 1, wherein said key fob controller comprises a communication disabler for disabling a direct communication between said key fob and said PKES when said determination confirms that said driver's device is outside said vehicle.

20. The method as defined in claim 11, further comprising detecting a trigger signal from one of the group consisting of:
from an LF challenge transmission from said PKES system or from a transmitter module comprising a battery, switch and transmitter;
said module being packageable and adherable to a door handle; and
on a door next to said handle or from a connection to wiring of the vehicle to a signal indicating actuation of a door button.

* * * * *